(12) United States Patent
Slawinski et al.

(10) Patent No.: US 11,526,268 B2
(45) Date of Patent: *Dec. 13, 2022

(54) PRESENTATION OF MULTIVARIATE DATA ON A GRAPHICAL USER INTERFACE OF A COMPUTING SYSTEM

(71) Applicant: Palantir Technologies Inc., Denver, CO (US)

(72) Inventors: Albert Slawinski, Palo Alto, CA (US); Andreas Sjoberg, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,455

(22) Filed: Apr. 27, 2021

(65) Prior Publication Data
US 2021/0318795 A1    Oct. 14, 2021

Related U.S. Application Data

(63) Continuation of application No. 16/555,062, filed on Aug. 29, 2019, now Pat. No. 11,016,649, which is a continuation of application No. 15/691,594, filed on Aug. 30, 2017, now Pat. No. 10,437,450, which is a continuation of application No. 14/507,757, filed on Oct. 6, 2014, now Pat. No. 9,785,328.

(51) Int. Cl.
| | | |
|---|---|---|
| G06F 3/048 | (2013.01) | |
| G06F 3/0484 | (2022.01) | |
| G06F 16/904 | (2019.01) | |
| G06Q 30/02 | (2012.01) | |
| G06F 3/04847 | (2022.01) | |

(52) U.S. Cl.
CPC ........ *G06F 3/04847* (2013.01); *G06F 16/904* (2019.01); *G06Q 30/02* (2013.01)

(58) Field of Classification Search
CPC .... G06F 3/04847; G06F 16/904; G06Q 30/02
See application file for complete search history.

(56) References Cited

U.S. PATENT DOCUMENTS

| | | | |
|---|---|---|---|
| 8,487,930 B2 * | 7/2013 | Navratil | ................ G06T 11/206 345/440.2 |
| 9,785,328 B2 | 10/2017 | Slawinski et al. | |
| 10,437,450 B2 | 10/2019 | Slawinski et al. | |
| 11,016,649 B2 | 5/2021 | Slawinski et al. | |
| 2004/0267770 A1 * | 12/2004 | Lee | ..................... G06F 16/2465 |
| 2007/0211057 A1 * | 9/2007 | Navratil | ................ G06T 11/206 345/440 |
| 2010/0191678 A1 * | 7/2010 | Steed | .................... G06T 11/206 706/11 |

(Continued)

*Primary Examiner* — Tadesse Hailu
(74) *Attorney, Agent, or Firm* — Knobbe, Martens, Olson & Bear, LLP

(57) ABSTRACT

Various systems, methods, and media allow for graphical display of multivariate data in parallel coordinate plots and similar plots for visualizing data for a plurality of variables simultaneously. These systems, methods, and media can aggregate individual data points into curves between axes, significantly improving functioning of computer systems by decreasing the rendering time for such plots. Certain implementations can allow a user to examine the relationship between two or more variables, by displaying the data on non-parallel or other transformed axes.

17 Claims, 22 Drawing Sheets

(56) References Cited

U.S. PATENT DOCUMENTS

| | | | | |
|---|---|---|---|---|
| 2014/0247267 A1* | 9/2014 | Kumar Kn | ............ | G06T 11/206 345/440 |
| 2015/0007079 A1* | 1/2015 | Hansen | ................ | G06T 11/206 715/771 |
| 2015/0199420 A1* | 7/2015 | Hansen | ................ | G06F 16/904 707/737 |

* cited by examiner

PRESENTATION OF MULTIVARIATE DATA ON A GRAPHICAL USER INTERFACE OF A COMPUTING SYSTEM

PRIORITY INFORMATION AND INCORPORATION BY REFERENCE

This application claims priority under 35 U.S.C. § 120 and is a continuation of U.S. patent application Ser. No. 16/555,062, filed on Aug. 29, 2019 and titled "PRESENTATION OF MULTIVARIATE DATA ON A GRAPHICAL USER INTERFACE OF A COMPUTING SYSTEM," which is a continuation of U.S. patent application Ser. No. 15/691,594, filed on Aug. 30, 2017 and titled "PRESENTATION OF MULTIVARIATE DATA ON A GRAPHICAL USER INTERFACE OF A COMPUTING SYSTEM," which is a continuation of U.S. patent application Ser. No. 14/507,757 filed on Oct. 6, 2014 and titled "PRESENTATION OF MULTIVARIATE DATA ON A GRAPHICAL USER INTERFACE OF A COMPUTING SYSTEM," the entire content of which is hereby expressly incorporated by reference in its entirety for all purposes. In addition, any and all applications for which a foreign or domestic priority claim is identified in the Application Data Sheet as filed with the present application are also expressly incorporated by reference.

BACKGROUND

Field

This disclosure relates to systems for visually presenting multivariate data on a graphical user interface and methods and computer-related media related thereto.

Description of the Related Art

Parallel coordinates is a visualization method for multivariate data sets. A parallel coordinates system arranges several dimensions as parallel axes next to each other in a plane and renders each data point in the multivariate data set as a line intersecting each of the axes. A parallel-coordinates plot provides an overview of the relations between the variables. A significant drawback of a parallel coordinates plot is the visual clutter that results for large data sets. Another drawback is "overplotting," in which the lines representing the data points are plotted on top of each other, which can hamper the recognition of patterns in the data set.

SUMMARY

Disclosed herein are various systems, methods, and computer-readable media for plotting multivariate data. At least some of the systems, methods, and media can aggregate individual data points into curves between axes, significantly improving functioning of computer systems by decreasing the rendering time for such plots. Certain implementations can allow a user to examine the relationship between two or more variables, by displaying the data on non-parallel or other transformed axes. It should be appreciated that the systems, methods, and media involve processing and graphically displaying large pluralities of data that could not be done by a human. For example, a plot may include hundreds of thousands, millions, tens of millions, hundreds of millions, or even billions of data points, and may consume significant storage and/or memory. Determination, selection, and analysis of data points within such a plot may be extremely difficult. Such data can also be processed, updated, and/or in real-time in accordance with the disclosed embodiments.

The systems, methods, and devices described herein each have several aspects, no single one of which is solely responsible for its desirable attributes. Without limiting the scope of this disclosure, several non-limiting features will now be discussed briefly.

In at least one embodiment, a computing system for representing multivariate data on a plurality of axes is provided. The computing system can generally comprise a network interface coupled to a data network for receiving and transmitting one or more packet flows comprising the multivariate data; a computer processor; and a non-transitory computer readable storage medium storing program instructions for execution by the computer processor in order to cause the computing system to generate a user interface depicting a first shape corresponding to a first variable of the multivariate data, the first shape comprising a first region having at least two dimensions including a first height extending along a first axis of the plurality of axes and a first width perpendicular to the first axis, the first region associated with a first value or a range of first values of the first variable, and a second shape spaced from the first shape, the second shape corresponding to a second variable of the multivariate data and the second shape comprising a second region having at least two dimensions including a second height extending along a second axis of the plurality of axes and a second width perpendicular to the second axis, the second region associated with a second value or a range of second values of the second variable, and a third region aligned with the second region along the second axis, the third region associated with a third value or a range of third values of the second variable. The first width and/or the second width can be non-zero.

In various embodiments, the foregoing computing system has one, some, or all of the following properties, as well as properties described elsewhere in this disclosure. The multivariate can be displayed in parallel coordinates on a plurality of parallel axes. The first region can have a first color. The first region can have one or more first textual labels within the first width and at least partially within the first height. The second region can have a second color. The second region can have one or more second textual labels within the second width and at least partially within the second height. The third region can have a third color distinct from the second color.

Additional properties include one, some, or all of the following. The program instructions can cause the computing system to depict on the user interface a first curve in the space between the first shape and the second shape. The first curve can be non-linear. The first curve can have a first length from a periphery of the first region to a periphery of the second region. The first curve can have a first thickness generally perpendicular to the first length. The first thickness can be generally uniform. The first thickness can be proportional to a first aggregation of the multivariate data corresponding to the first value or the range of first values of the first variable associated with the first region and the second value or the range of second values of the second variable associated with the second region. The first color of the first region can define a color of the first curve.

In addition, the program instructions can cause the computing system to receive a first user instruction to remove the depiction of the first curve on the user interface. The first user instruction can comprise user selection of a fourth region on the first shape, the fourth region distinct from the first region. The first user instruction can comprise a zoom-in operation removing the first region from the first shape. The program instructions can cause the computing system to visually deaggregate the multivariate data corresponding to the first value or the range of first values of the first variable associated with the first region and the second value or the range of second values of the second variable associated with the second region. The first shape can comprise a plurality of regions including the first region, and the program instructions can cause the computing system to receive a zoom-out operation changing a number of regions in the plurality of regions. The program instructions can cause the computing system to depict a third textual label at least partly superimposed on the first curve. The third textual label can reflect the first aggregation.

In addition, the program instructions can cause the computing system to depict on the user interface a second curve in the space between the first shape and the second shape. The second curve can be non-linear. The second curve can have a second length from the periphery of the first region to a periphery of the third region. The second curve can have a second thickness generally perpendicular to the second length. The second thickness can be generally uniform. The second thickness can be proportional to a second aggregation of the multivariate data corresponding to the first value or the range of first values of the first variable associated with the first region and the third value or the range of third values of the second variable associated with the third region. The first color of the first region can define a color of the second curve. The program instructions can cause the computing system to receive a second user instruction to remove the depiction of the second curve on the user interface. The program instructions can cause the computing system to visually deaggregate the multivariate data corresponding to the first value or the range of first values of the first variable associated with the first region and the third value or the range of third values of the second variable associated with the third region.

Other embodiments include, without limitation, computer-readable media that includes instructions that enable a processing unit to implement one or more aspects of the disclosed systems as well as methods for performing one or more aspects of the disclosed systems.

In at least one embodiment, a computer-implemented method of representing multivariate data on a plurality of axes is provided. The computer-implemented method can comprise, as implemented by one or more computer systems comprising computer hardware and memory, the one or more computer systems configured with specific executable instructions, generating a user interface depicting a first shape corresponding to a first variable of the multivariate data, the first shape comprising a first region having at least two dimensions including a first dimension extending along a first axis of the plurality of axes and a second dimension generally perpendicular to the first axis, the first region associated with a first value or a range of first values of the first variable, a second shape spaced from the first shape, the second shape corresponding to a second variable of the multivariate data and the second shape comprising a second region having at least two dimensions including a third dimension extending along a second axis of the plurality of axes and a fourth dimension generally perpendicular to the second axis, the second region associated with a second value or a range of second values of the second variable, and a third region aligned with the second region along the second axis, the third region associated with a third value or a range of third values of the second variable. The second dimension and/or the fourth dimension can be non-zero.

In various embodiments, the foregoing method has one, some, or all of the following properties, as well as properties described elsewhere in this disclosure. The axes can be parallel. The first region can have a first distinguishing visual appearance. The first distinguishing visual appearance can comprise a first color, a first pattern, a first grayscale intensity, a first shading, or a first hatching. The second region can have a second distinguishing visual appearance. The third region can have a third distinguishing visual appearance distinct from the second distinguishing visual appearance.

Additional properties include one, some, or all of the following. The method can include depicting on the user interface a first curve in the space between the first shape and the second shape. The first curve can be non-linear. The first curve can have a first length from a periphery of the first region to a periphery of the second region. The first curve can have a first thickness generally perpendicular to the first length. At least part of the first thickness can be proportional to a first aggregation of the multivariate data corresponding to the first value or the range of first values of the first variable associated with the first region and the second value or the range of second values of the second variable associated with the second region. The first distinguishing visual appearance of the first region can define a distinguishing visual appearance of the first curve. The method can further comprise receiving a first user instruction to remove the depiction of the first curve on the user interface. The method can further comprise depicting a textual label at least partly superimposed on the first curve. The textual label can reflect the first aggregation.

In addition, the method can include depicting on the user interface a second curve in the space between the first shape and the second shape. The second curve can be non-linear. The second curve can have a second length from the periphery of the first region to a periphery of the third region. The second curve can have a second thickness generally perpendicular to the second length. At least part of the second thickness can be proportional to a second aggregation of the multivariate data corresponding to the first value or the range of first values of the first variable associated with the first region and the third value or the range of third values of the second variable associated with the third region. The first visual appearance of the first region can define a distinguishing visual appearance of the second curve. The method can further comprise receiving a second user instruction to grow or shrink the third dimension.

Other embodiments include, without limitation, computer-readable media that includes instructions that enable a processing unit to implement one or more aspects of the disclosed methods as well as systems for performing one or more aspects of the disclosed methods.

In at least one embodiment, a non-transitory computer-readable medium is disclosed, the medium comprising one or more program instructions recorded thereon, the instructions configured for execution by a computing system comprising one or more processors in order to cause the computing system to generate a user interface. The user interface can depict a first shape corresponding to a first variable of the multivariate data, the first shape comprising a first region having at least two dimensions including a first dimension extending along a first axis of the plurality of axes and a second dimension generally perpendicular to the first axis, the first region associated with a first value or a range of first values of the first variable, and a second shape spaced from the first shape, the second shape corresponding to a second variable of the multivariate data and the second shape comprising a second region having at least two dimensions including a third dimension extending along a second axis of the plurality of axes and a fourth dimension generally perpendicular to the second axis, the second region associated with a second value or a range of second values of the second variable. The second dimension and/or the fourth dimension can be non-zero.

In various embodiments, the foregoing medium has one, some, or all of the following properties, as well as properties described elsewhere in this disclosure. The user interface can depict on the user interface a curve in the space between the first shape and the second shape. The curve can be non-linear. The curve can have a length from a periphery of the first region to a periphery of the second region. The curve can have a non-uniform thickness generally perpendicular to the first length. The thickness can comprise a first part adjacent the first region, a third part adjacent the second region, and a second part between the first part and the third part, the third part thinner than the first part and the second part and proportional to an aggregation of the multivariate data corresponding to the first value or the range of first values of the first variable associated with the first region and the second value or the range of second values of the second variable associated with the second region.

Additional properties include one, some, or all of the following. The first region can have a first distinguishing visual appearance. The first distinguishing visual appearance can comprise a first color, a first pattern, a first grayscale intensity, a first shading, or a first hatching. The first curve can have the first distinguishing visual appearance of the first region. The computing system can receive a first user instruction to remove the depiction of the curve on the user interface. The computing system can receive a second user instruction to grow or shrink the first dimension. The computing system can depict a first textual label at least partly superimposed on the curve. The first textual label can reflect the aggregation. The computing system can depict one or more second textual labels within the first dimension and at least partially within the second dimension. The computing system can move the second shape from a first position parallel the first shape to a second position perpendicular to the second shape, in response to a third user instruction.

For purposes of summarizing the embodiments and the advantages achieved over the prior art, certain items and advantages are described herein. Of course, it is to be understood that not necessarily all such items or advantages may be achieved in accordance with any particular embodiment. Thus, for example, those skilled in the art will recognize that the inventions may be embodied or carried out in a manner that achieves or optimizes one advantage or group of advantages as taught or suggested herein without necessarily achieving other advantages as may be taught or suggested herein. Any flow charts or other data flow described herein do not imply a fixed order to the steps, and embodiments of the inventions may be practiced in any order that is practicable.

BRIEF DESCRIPTION OF THE DRAWINGS

A general architecture that implements the various features of the disclosed systems, methods, and media will now be described with reference to the drawings. The drawings and the associated descriptions are provided to illustrate embodiments and not to limit the scope of the disclosure. The first one or two digits of each reference number typically indicate the figure in which the element first appears. Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION

This disclosure relates to computing systems for representing multivariate data. As used herein, "multivariate data" refers to data involving two or more variables, such as a data involving three or more variables.

In at least one embodiment, such a computing system includes one or more computers, as described in greater detail below in relation to FIG. 20. The system can also include a network interface coupled to a data network for receiving and transmitting one or more packet flows comprising the multivariate data. The system can further comprise a computer processor and a computer readable storage medium storing program instructions for execution by the computer processor. Suitable computer readable media include non-transitory computer readable storage media.

The program instructions can cause the computer processor to generate a user interface. The user interface can be displayed on a computer display communicating directly or indirectly with the computing system. For example, the computer display can be local to the computing system. In other configurations, the display can be remote from the computing system and communicating with a computing device that is in communication with the described computing system.

Displaying Parallel Coordinate Axes

Figure 1:
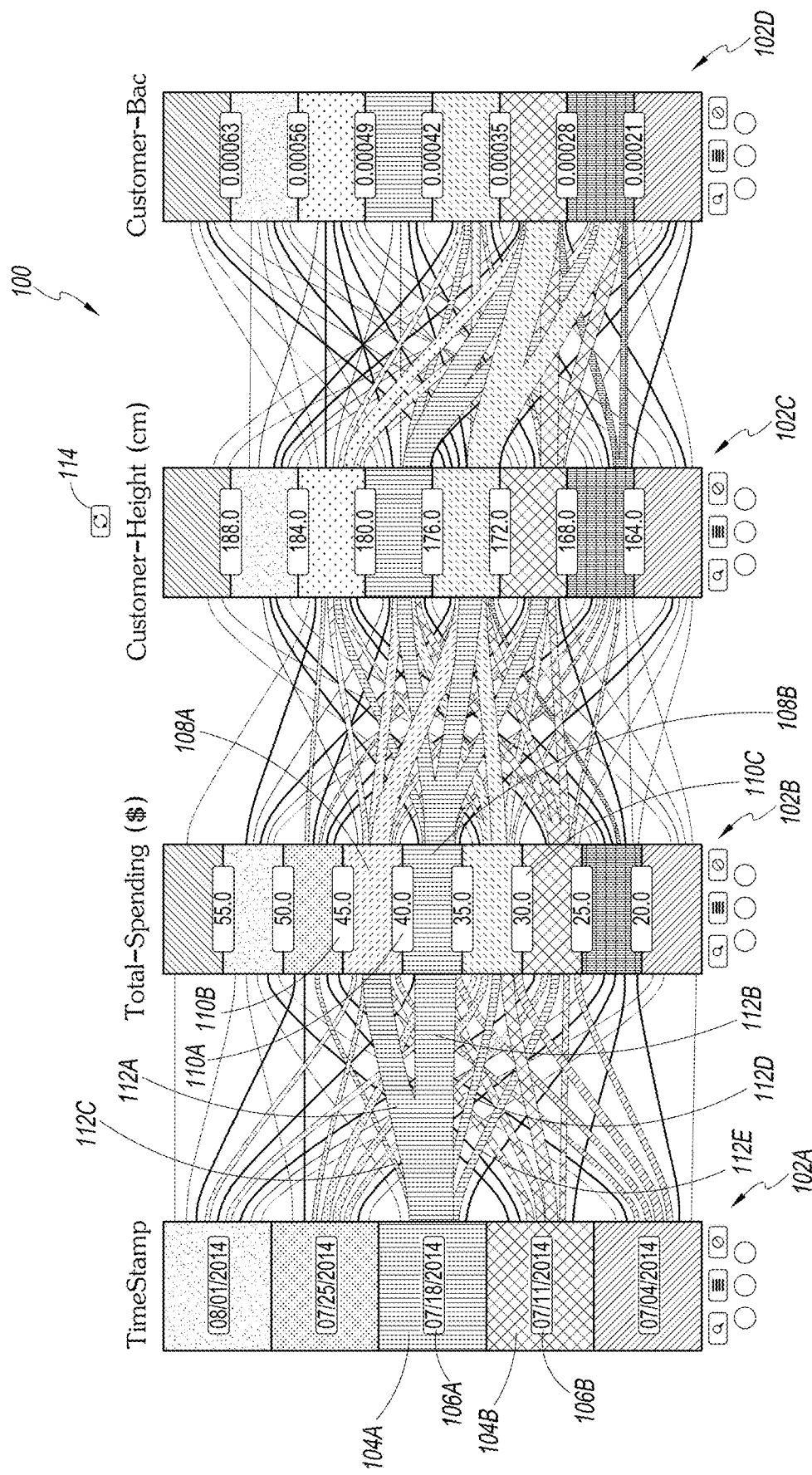
FIG. 1 shows a parallel coordinates plot according to at least one embodiment.

For a more detailed understanding of the disclosure, reference is first made to FIG. 1, which illustrates an example user interface 100 for multivariate data presentation. The example data set of FIG. 1 involves four variables: time, total spending ($), customer height (cm), and customer blood alcohol content (BAC). The data types, values, ranges, etc. used in this example, and other example user interfaces discussed herein, are only illustrative and do not limit the scope of application of the systems and methods discussed herein to other data types, values, ranges, etc.

User interface 100 represents the multivariate data on a plurality of parallel axes that are spaced apart from each other. Specifically, user interface 100 depicts four shapes (102A, 102B, 102C, 102D) each corresponding to one of the four variables and each extending along a parallel axis. First shape 102A corresponds with the time variable, second shape 102B corresponds with the amount spent variable, third shape 102C corresponds with the customer height variable, and fourth shape 102D corresponds with the customer BAC variable. In this example, the parallel axes are disposed vertically. Nevertheless, the parallel axes can also appear in other configurations, such as horizontally. The configuration of FIG. 1 represents an improved parallel coordinates plot.

In FIG. 1, each of the four shapes 102A, 102B, 102C, 102D is a rectangle. Nevertheless, a variety of shapes are appropriate. Suitable shapes include two and three dimensional rectilinear and curvilinear shapes, such as circles, ovals, ovates, cuneates, triangles, quadrilaterals, higher order polygons, and the like.

Each of the shapes 102A, 102B, 102C, and 102D can be initially ordered based on user preference, by alphabetical order, or by some other order (including a random order). Desirably, suitable program instructions stored on a non-transitory computer readable storage medium are executed by a computer processor in order to cause the computing system of FIG. 20 to load the underlying data set and calculate the covariance between pairs of variables to determine the order in which the variables are most highly correlated. The shapes 102A, 102B, 102C, and 102D of FIG. 1 can then be displayed in an order of increasing or decreasing correlation.

In certain embodiments, a shape is automatically presented for each variable in a data a set. Nevertheless, the selection of shapes can be configurable. For example, a user could drag and drop shapes or check a box in a relevant menu to add variables (shapes) to or remove such variables from user display 100.

Each of the shapes 102A, 102B, 102C, and 102D includes a plurality of regions visually differentiated from the other regions of the shape. Each of the regions in a shape is associated with different value or range of values of the variable associated with that shape. The default number of regions in a shape can be, for example, a user defined or pre-defined number (such as five, eight, or ten) or automatically determined by suitable program instructions stored on a non-transitory computer readable storage medium and executed by a computer processor, based on the underlying data. The term "automatically" is a broad term and is to be given its ordinary and customary meaning to a person of ordinary skill in the art (that is, it is not to be limited to a special or customized meaning) and pertains, without limitation, to functions that, once initiated are performed by a computer processor without the need for manually performing the function. For example, the program instructions can determine a maximum value and a minimum value for data points intersecting the relevant shape, as well as the number of such intersecting data points. Based on some or all of these variables, the computer processor can determine a suitable number of regions. A large number of data points spanning a wide range of values may necessitate more regions for accurate data visualization and manipulation than a small number of data points spanning a small range of values would.

First shape 102A comprises five regions (including regions 104A and 104B) each visually differentiated from the other regions. Second shape 102B also includes a plurality of regions, each visually differentiated from the other regions of second shape 102B. In the example of FIG. 1, each region of first shape 102A is represented by a distinct pattern that is different from that of the other regions of first shape 102A. Similarly, each region of second shape 102B is represented by a distinct pattern that is different from that of the other regions of second shape 102B. Nevertheless, other means for visual differentiation can be used, such as color, grayscale, shading, hatching, outlining, or some other technique visually demarcating the regions. And although the patterns of FIG. 1 are indicative of a progression of values, patterns can alternatively convey information such as frequencies, differences between axes, and data characteristics. In other words, the regions in a shape need not be continuous. For example, rather than showing a continuous progression of dates as in shape 102A, the shapes could have shown the dates grouped by data characteristics (all Mondays in a quarter grouped together, all Tuesdays in a quarter grouped together, etc.).

As discussed above, the regions of the first shape 102A include first region 104A and second region 104B. First region 104A has two dimensions including a height extending along the vertical axis of shape 102A and a non-zero width perpendicular to that axis. As used herein "non-zero width" refers to a substantial width. In other words, a shape having a height and zero width is a line, while a shape having a height and a non-zero or substantial width is a shape other than a line, such as a two or three dimensional rectilinear and curvilinear shape as discussed above. Second region 104B also has two dimensions: a height extending along the vertical axis of shape 102A (and in line with the height of first region 104A) and a non-zero width perpendicular to that axis. In the example of FIG. 1, the widths of first region 104A and 104B are the same because the overall shape of first shape 102A is rectangular. In alternative configurations, in which the overall shape of the first shape 102A is not a parallelogram (such as when the overall shape is triangular), the widths can be different. And although the regions in each of the shapes of FIG. 1 have relatively similar heights, such a configuration is optional, as discussed below.

In FIG. 1, only data points with a definite value for all four variables are displayed on the user interface 100. Thus, for example, a data point with definite values for time, amount spent, and customer BAC, but no definite value for customer height is not displayed on user interface 100. Certain embodiments include the inventive realization that data can be displayed, even when the data is incomplete, by adding an additional region (such as a null value region) on certain shapes.

As shown in the user interface 100 configuration of FIG. 1, at least some of the regions of the shapes 102A, 102B, 102C, and 102D are visually associated with textual labels. In certain embodiments, the textual labels are visually associated with their respective regions by appearing at least partially within the widths of the respective marked regions. In particularly advantageous embodiments, a textual label is entirely within the width of the associated region. Such a configuration is desirable because it allows a viewer of the user display 100 to more clearly discern that a particular value in the textual label is associated with a region and to more readily read the value. When a textual label appears outside the width of the region—for example, partly or entirely in the space between shapes—the value in the textual label can be more difficult to read. This situation is particularly problematic when there are a large number of curves in the space between shapes. At least some embodiments include the inventive realization that readability can be improved by locating a textual label entirely within the width of a region associated with the textual label.

The range of data intersecting a shape may not easily lend itself to textual labeling. For example, with reference to FIG. 1, the underlying data for total spending (reflected in shape 102B) may range between $14.48 and $59.99. Typical users examining the holistic relationship between time and total spending may not be interested in the fraction of a dollar spent by customers. And regions spanning $14.48 and $59.99, incremented by $5.05666 may be visually overwhelming and confusing to such users. Accordingly, in at least one embodiment, the upper and lower values for a region comprising a range of values can be automatically adjusted so that the related textual label(s) display whole numbers or a limited number of decimal places to promote readability and ease of use.

In FIG. 1, first region 104A is marked by a textual label 106A entirely within the width of first region 104A. Textual label 106A is also entirely within the height of first region 104A. Second region 104B also includes a textual label 106B placed entirely within the height and entirely within the width of the second region 104B. As indicated by the textual labels, first region 104A is associated with a range of dates for a week including Jul. 18, 2014, and second region 1048 is associated with a range of dates for a week including Jul. 11, 2014.

As discussed above, user interface 100 also depicts a second shape 102B spaced from first shape 102A. Shape 102B includes a second region 108A having two dimensions, including a height extending along the vertical axis of shape 1028 and a non-zero width perpendicular to that axis. Second region 108A is characterized by a first pattern, and second region 108A is associated with values of total spending in the range of $40 and $45. Second region 108A is associated with two textual labels 110A, 1108 entirely within the width of second region 108A. Each of the two labels 110A, 1108 is partially within the height of the region 108A. Label 110A crosses the top periphery of second region 108A. Label 1108 crosses the bottom periphery of second region 108A.

Shape 102B also includes a third region 108B that is aligned with the second region 108A along the vertical axis of shape 102B. Third region 108B has a pattern that is distinct from the pattern of second region 108A. Third region 1088 is associated values of total spending in the range of $35 and $40.

The example of FIG. 1 shows one shape displayed along each axis, and each shape is continuous. Nevertheless, it should be understood that certain embodiments comprise multiple shapes along one or more axes, such as discontinuous shapes. For example, a car dealership may sell very high priced cars retailing for tens of thousands of dollars and automotive accessories retailing for hundreds of dollars. But the dealership may have very little or no products retailing for thousands of dollars. Thus, shape 102B could be split into two shapes stacked on top of each other. The lower shape could reflect to the total spending on the automotive accessories and the upper shape could reflect the total spending on the cars. Such plural shapes could be determined automatically, for instance, when program logic detects a gap in data for a particular variable. Or the plural shapes could be defined by a user, for instance, when the user is disinterested in certain data ranges.

Displaying Curves in Parallel Coordinates

The aforementioned program instructions can, in certain embodiments, cause the computer processor to depict on the user interface 100 a plurality of curves (e.g., including curves 112A, 112B, 112C, 112D, 112E) in the space between shapes 102A, 102B, 102C, 102D. "Curve" is a broad term and is to be given its ordinary and customary meaning to a person of ordinary skill in the art (that is, it is not to be limited to a special or customized meaning) and includes, without limitation, straight lines, angled lines such as step functions, and bending lines without angles such as quadratic curves, Bezier curves, and smoothed curves. Such bending lines without angles are generally referred to herein as "non-linear."

As shown in FIG. 1, each curve has a length extending between a region on one shape (the origin region) and a region on an adjacent shape (the end region) in the space between shapes. Furthermore, each curve has a thickness generally perpendicular to the length of the curve.

At least part of the thickness of a curve can be proportional to an aggregation of the multivariate data corresponding to the value or the range of values of the variable associated with the origin region and the second value or the range of second values of the variable associated with the end region. The aggregation can reflect a summation of or a proportionality of the number of data points associated origin region and the end region. Certain embodiments include the inventive realization that displaying curves representing an aggregation of multivariate data, rather than individual curves for each data point, can improve the performance of a computer system by decreasing rendering time.

In certain embodiments, a curve has a uniform thickness. This configuration is desirable and includes the inventive realization that a uniform thickness may better convey the amount of data associated with two regions than a non-uniform thickness would to certain users. Nevertheless, in other embodiments, the thickness of the curve can be non-uniform. For example, a curve could be thicker at the origin region and thinner at the end region, or vice versa. As another example, the curve could be thinner at origin region and the end region and thicker in the space between the regions, or vice versa. Having thinner parts of the curves near the shapes and the thicker part in the space between shapes (wherein the thicker part can reflect the aggregation of data corresponding to the value or the range of values of the variable associated with the origin region and the second value or the range of second values of the variable associated with the end region) can be desirable because it reduces visual clutter near the shapes and emphasizes the amounts of data in the aggregated data between two regions. On the other hand, having thicker parts of the curves near the shapes and the thinner part in the space between shapes (wherein the thinner part can reflect the aggregation of data corresponding to the value or the range of values of the variable associated with the origin region and the second value or the range of second values of the variable associated with the end region) can be desirable because it emphasizes the particular region from which a curve originates or ends, while accurately showing the amounts of data in the aggregated data between two regions.

In certain embodiments, the thickness of a curve is not proportional to an aggregation of the multivariate data corresponding to the value or the range of values of the variable associated with the origin region and the second value or the range of second values of the variable associated with the end region. In such embodiments, the visual appearance of the curve (rather than its thickness) can reflect the relative amount of multivariate data encompassed in the curve. For example, darker color intensities, more intense patterning, or darker grayscale intensities can be used to distinguish curves with more data points. This visual differentiation of curves can also be incorporated in embodiments having proportional-thickness curves.

The visual appearance of the origin region can define the visual appearance of the curve. Certain embodiments include the inventive realization that visually tying the appearance of a curve to the visual appearance of its corresponding origin region allows a user to more easily track the curve on the user interface 100.

In the example of FIG. 1, user interface 100 depicts a first curve 112A between a periphery of the first region 104A and a periphery of the second region 108A in the space between the first shape 102A and the second shape 102B. In this example, first curve 112A is non-linear. The curve 112A has a uniform thickness proportional to an aggregation of the data corresponding to the date range of region 104A and the total spending range of region 108A. The pattern of curve 112A is defined by the pattern of the origin region, namely, region 104A. Furthermore, as noted above, because other means for visual differentiation can be used for the origin region, the color, grayscale, shading, hatching, outlining, etc. of region 104A could also define the appearance of curve 112A.

User interface 100 also depicts a second curve 112B between the periphery of region 104A and a periphery of region 108B in the space between shape 102A and shape 102B. Curve 112B has a uniform thickness that is proportional to an aggregation of the data corresponding to the range of values of the variable associated with region 104A and the range of values associated with region 108B. Moreover, the pattern of region 104A defines the pattern of curve 112B because curve 112B originates at region 104A. As noted above, it can be advantageous when an origin region defines the visual appearance of the curve(s) extending from that region.

Additional curves, for example, curves 112C, 112D and 112E, also originate from region 104A and extend to regions of shape 102B. Each of these curves represents the data corresponding to the range of values associated with region 104A and the respective range of values associated with the regions of shape 102B that the curves contact. Because the thickness of the curves is proportional to an aggregation of data, the curves visually indicate the amount of data associated with pairs of values, ranges, or other groupings of variables.

The point where a curve intersects the origin region can be spaced apart from where another curve intersects the origin region. Likewise, the point where a curve intersects the end region can be spaced apart from where another curve intersects the end region. This spacing or staggering of curves can promote a cleaner display and avoid or diminish intersections between curves at the origin region. This configuration is shown in curves originating from region 104B of shape 102A.

In some cases, it can be appropriate to only depict curves between corresponding ranges on adjacent axes. For instance, in the context of FIG. 1, the curve between the top region of shape 102A and the top region of shape 102B is displayed, the curve between the next lower region of shape 102A and the next lower region of shape 102B is displayed, and so forth. This can be desirable when comparing similar regions in two adjacent axes. By way of example, one axis may represent spending in June, and the adjacent axis represents spending in July. Each axis is divided into weeks. Curves can be depicted between the first week in June and the first week in July, the second week June and the second week in July, and so forth.

It should be understood that the display of curves is optional. For example, instead of displaying curves, the aforementioned program instructions could cause the computer processor to depict on the user interface 100 a plurality of annotations regarding the relevant data. For example, the user interface 100 could display the percentage or a raw number of data points relating to a first region on a first axis and a second region on a second axis. Such embodiments are particularly well suited for highly correlated data.

Furthermore, curves can be presented between a unitary shape on one axis and plural shapes along an adjacent axis. For example, first shape 102A may reflect a "purchaser ID" variable, rather than a timestamp. The adjacent axis could have three shapes reflecting unit spending stacked one over another. A distinct curve could extend from a particular purchaser ID to a region on each of the three shapes corresponding to the price of an item purchased by the user, thereby visually presenting the price of each items purchased by a particular individual. The lines could then converge back to a single region on an adjacent axis for parameters common to all purchasers, such as customer height.

Non-Parallel Axes

Figure 2:
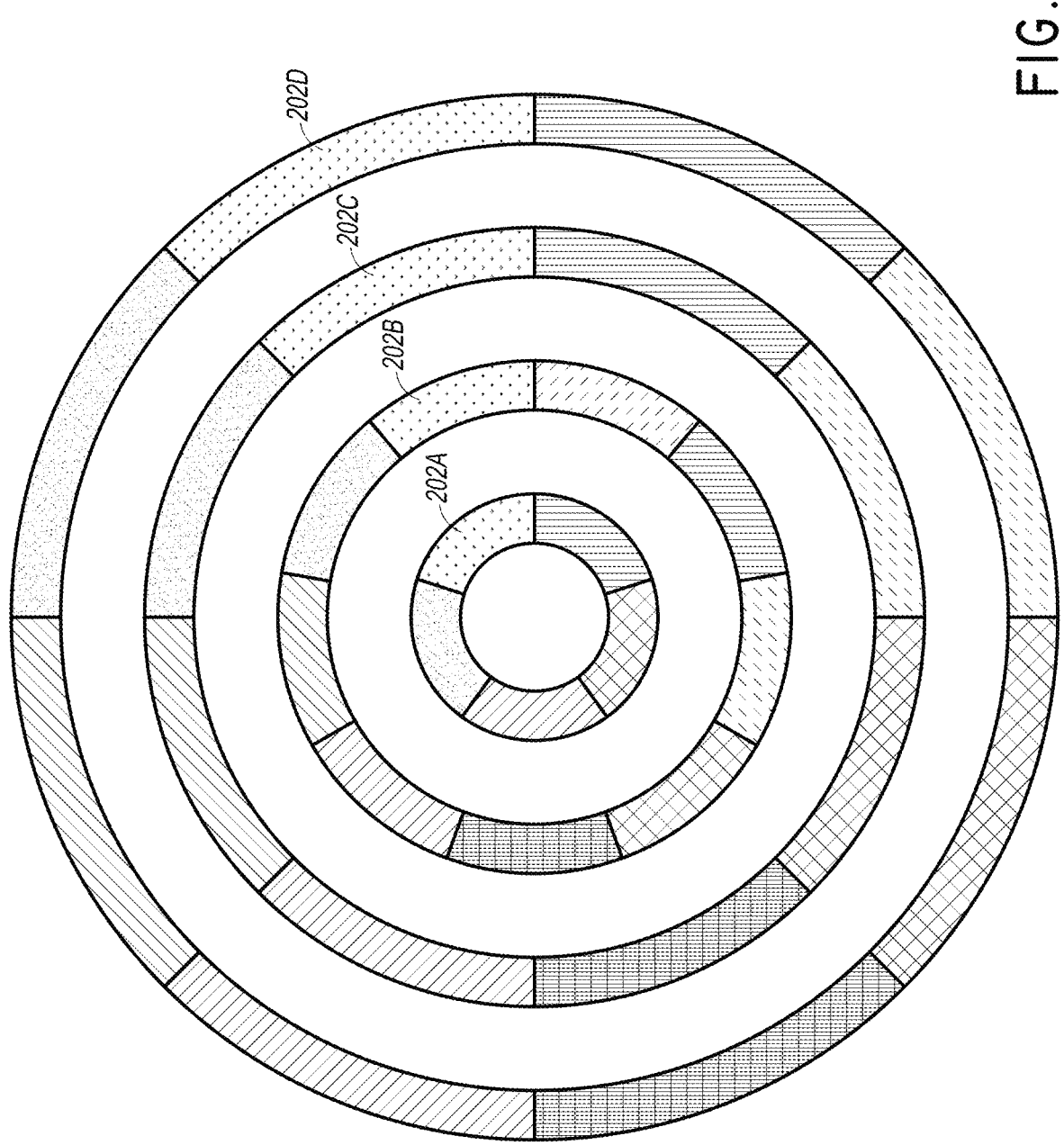
FIG. 2 shows a plot according to at least one embodiment with non-parallel, non-rectangular axes.

Although FIG. 1 displays a parallel coordinates plot for depicting multivariate data, the inventive aspects of this disclosure need not necessarily be displayed in this format. For example, FIG. 2 shows a plot with concentric axes rather than parallel axes. In FIG. 2 displays the shapes as concentric circles. Shape 202A generally corresponds with shape 102A of FIG. 1; shape 202B of FIG. 2 generally corresponds with shape 102B of FIG. 1; shape 202C of FIG. 2 generally corresponds with shape 102C of FIG. 1; and shape 202D of FIG. 2 generally corresponds with shape 102D of FIG. 1. The configuration of FIG. 1 can be desirable in certain circumstances because it easily allows data to be depicted between one region of an axis and a plurality of regions in an adjoining axis. Nevertheless, the configuration of FIG. 2 can be desirable in certain circumstances because it can allow a user to rotate the axes and more clearly visualize certain combinations of variables.

As discussed above, it can be appropriate to depict only curves between corresponding ranges on adjacent axes.

This foregoing configuration is particularly advantageous in the context of FIG. 2, in order to reduce visual clutter. For example, in FIG. 2, a curve can be depicted between ranges that align on the current rotation state of the circular axis. Neighboring curves can optionally be depicted.

Manipulating Data on a User Display

Figure 3:
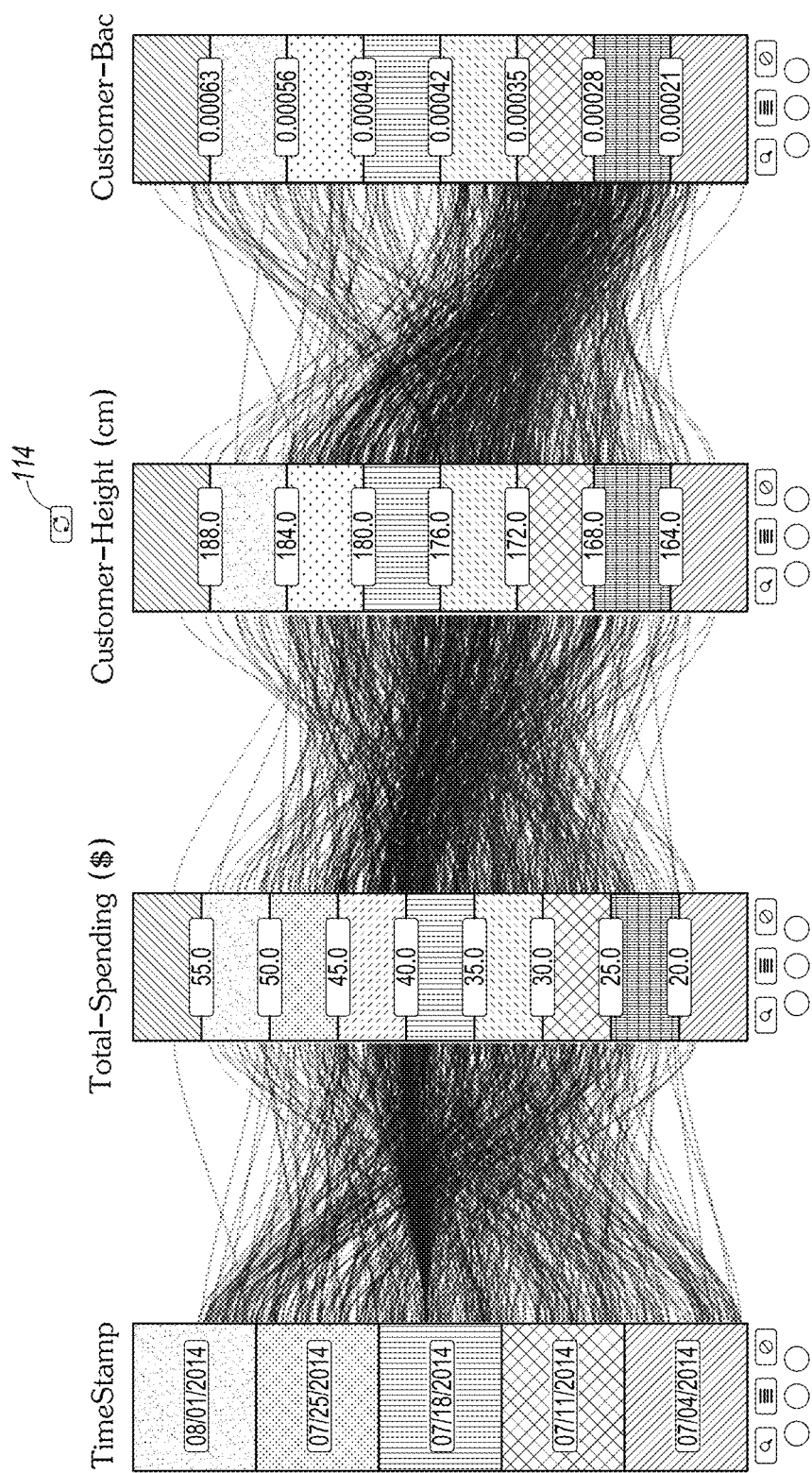
FIG. 3 shows a parallel coordinates plot with non-aggregated curves between axes.

With reference again to FIG. 1, the user interface 100 includes an optional toggle button 114 to allow a user to toggle between the aggregated data view of FIG. 1 and the individual points of data as shown in FIG. 3. In FIG. 3, each data point in the multivariate dataset is rendered as an individual curve extending between two shapes. FIG. 3 demonstrates the visual clutter and overplotting that can result for large datasets. A user can toggle back to the aggregated view by clicking toggle button 114.

Figure 4:
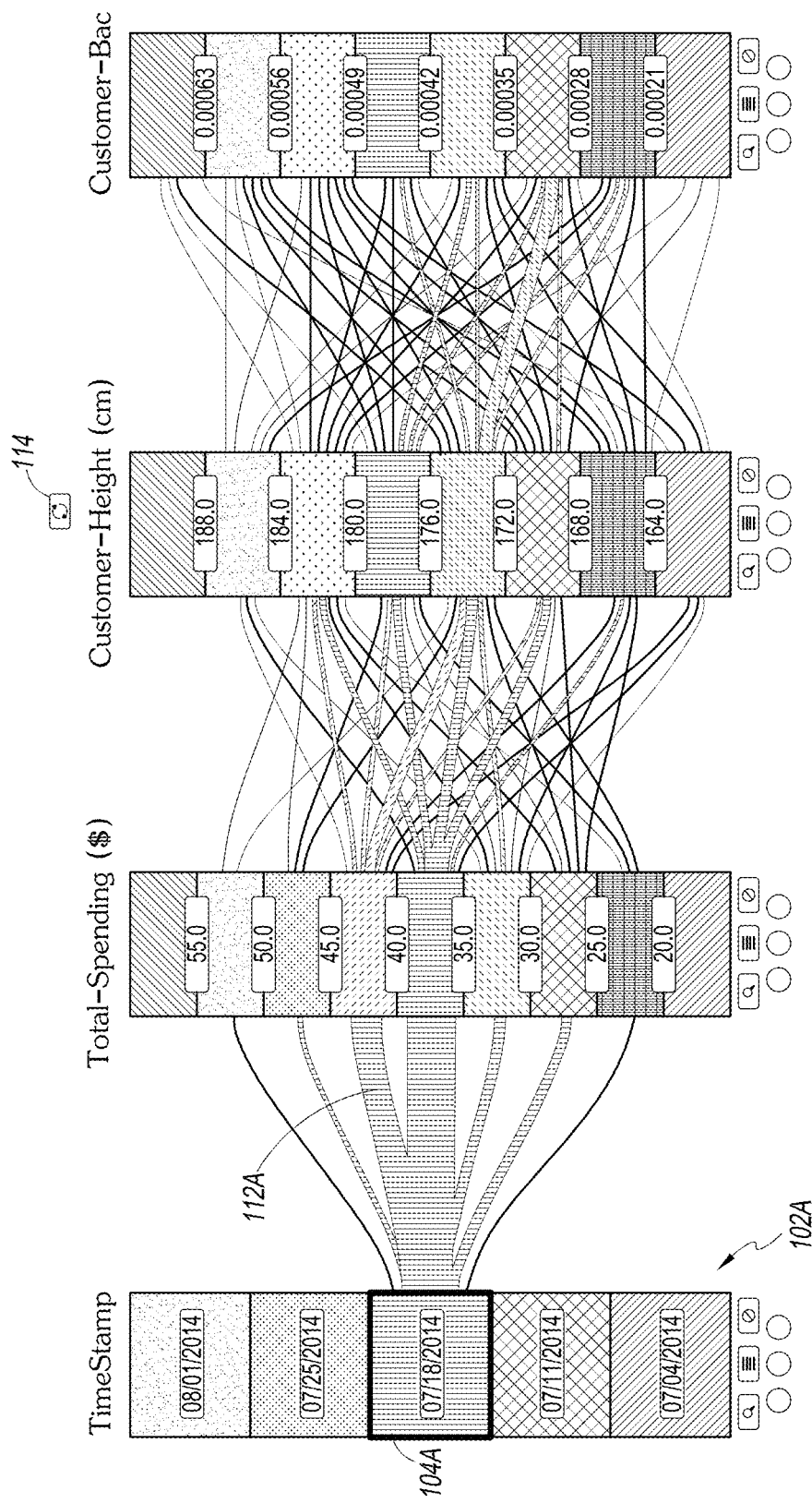
FIG. 4 shows a parallel coordinates plot with certain curves removed from the user display and aggregated curves between axes.

In certain embodiments, a user can transmit an instruction to remove the depiction of certain curves on user interface 100. For example, with reference next to FIG. 4, a user can transmit an instruction to remove the curves on shape 102A originating regions other than region 104A. In FIG. 4, the user performed an input operation, such as a click-select operation, on region 104A to focus on that region. User interface 100 can optionally provide a visual indication that region 104A has been clicked. For instance, the color, grayscale, shading, hatching, outlining, etc. of region 104A could change. In this example, bold outlining indicates the user selection. After region 104A is clicked, the data originating from the other regions of shape 102A became hidden. This allows a user to more effectively visualize the distribution of data originating from the time period of region 104A.

As noted above, in the context of FIG. 4, a user could select region 104A by positioning a cursor over region 104A and performing an input operation such a clicking a mouse button or tapping with a stylus or finger. The term clicking (and the related terms click and clicked) is a broad term and is to be given its ordinary and customary meaning to a person of ordinary skill in the art (that is, it is not to be limited to a special or customized meaning) and includes, without limitation, touching, depressing, indicating, or otherwise selecting. As used herein, "clicking" on an object on user interface 100 refers to positioning a cursor over the object and performing an input operation such a depressing a mouse button or tapping with a stylus or finger. In response to the input operation, suitable program instructions stored on a non-transitory computer readable storage medium are executed by a computer processor in order to cause the computing system of FIG. 20 to perform a desired operation on the object. In FIG. 4, the input operation is an instruction to remove the curves originating at regions other than region 104A. Suitable program instructions can then be executed to cause the computing system to remove the depictions of the relevant curves from user interface 100. A user can perform the above click-select operation on any number of regions. Furthermore, the selected regions need not be continuous.

Alternatively, in at least one embodiment, a user could select and perform an input operation on an individual curve, such as curve 112A, and suitable program instructions could be executed in order to cause the ranges 104A and 108A to be selected on user interface 100.

Figure 5:
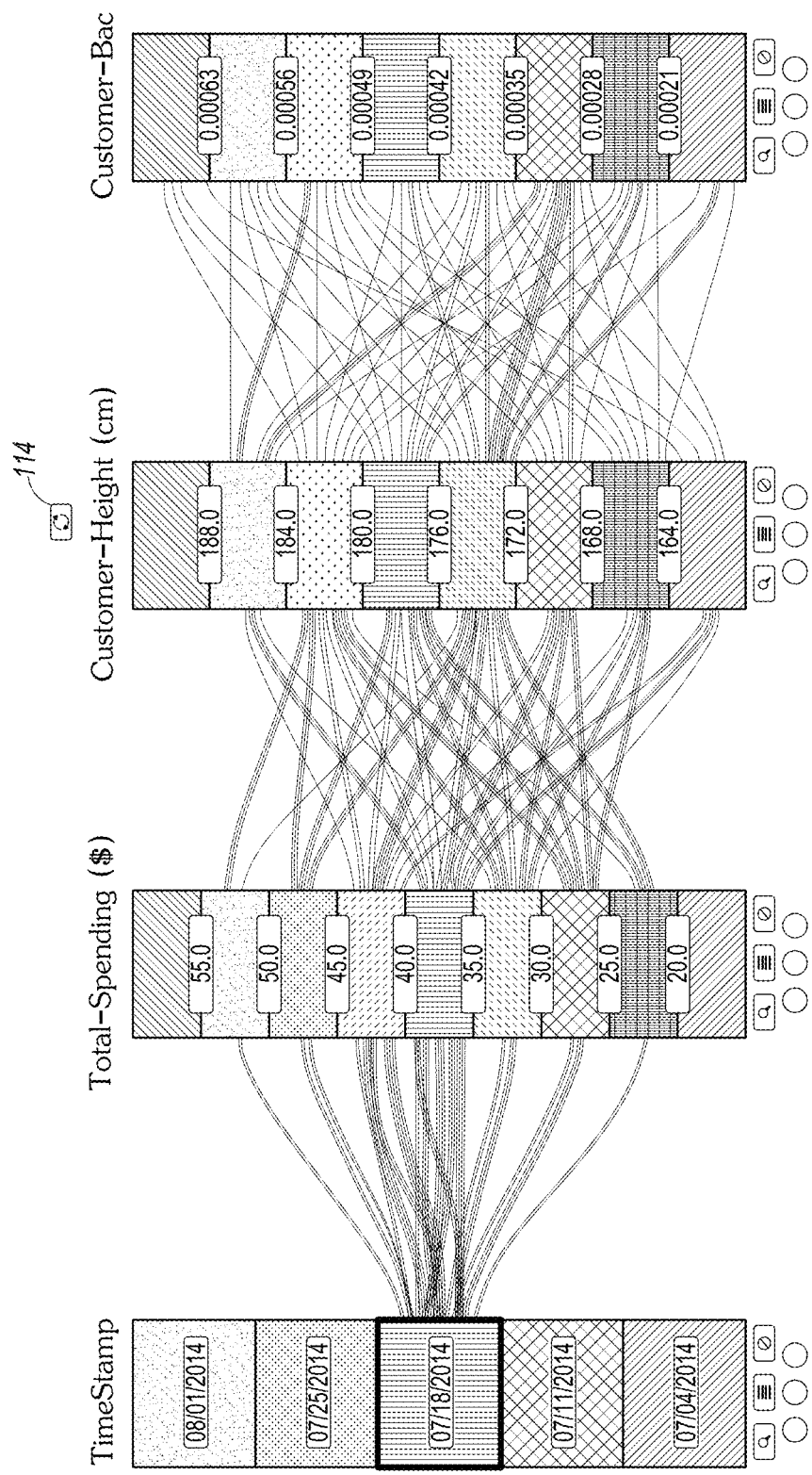
FIG. 5 shows a parallel coordinates plot with certain curves removed from the user display and non-aggregated curves between axes.

As discussed above, the user interface 100 includes a toggle button 114 to allow a user to toggle between an aggregated data view and individual points of data. In FIG. 5 (as in FIG. 3), each data point in the multivariate dataset is rendered as an individual curve extending between two shapes, in response to the user clicking on toggle button 114. FIG. 5 demonstrates that visual clutter and overplotting is reduced in smaller datasets. The toggle button 114 can be particularly useful for examining data after the depiction of certain curves has been removed from the user interface 100A. As noted, the user can toggle back to the aggregated view by clicking toggle button 114 again.

Figure 6:
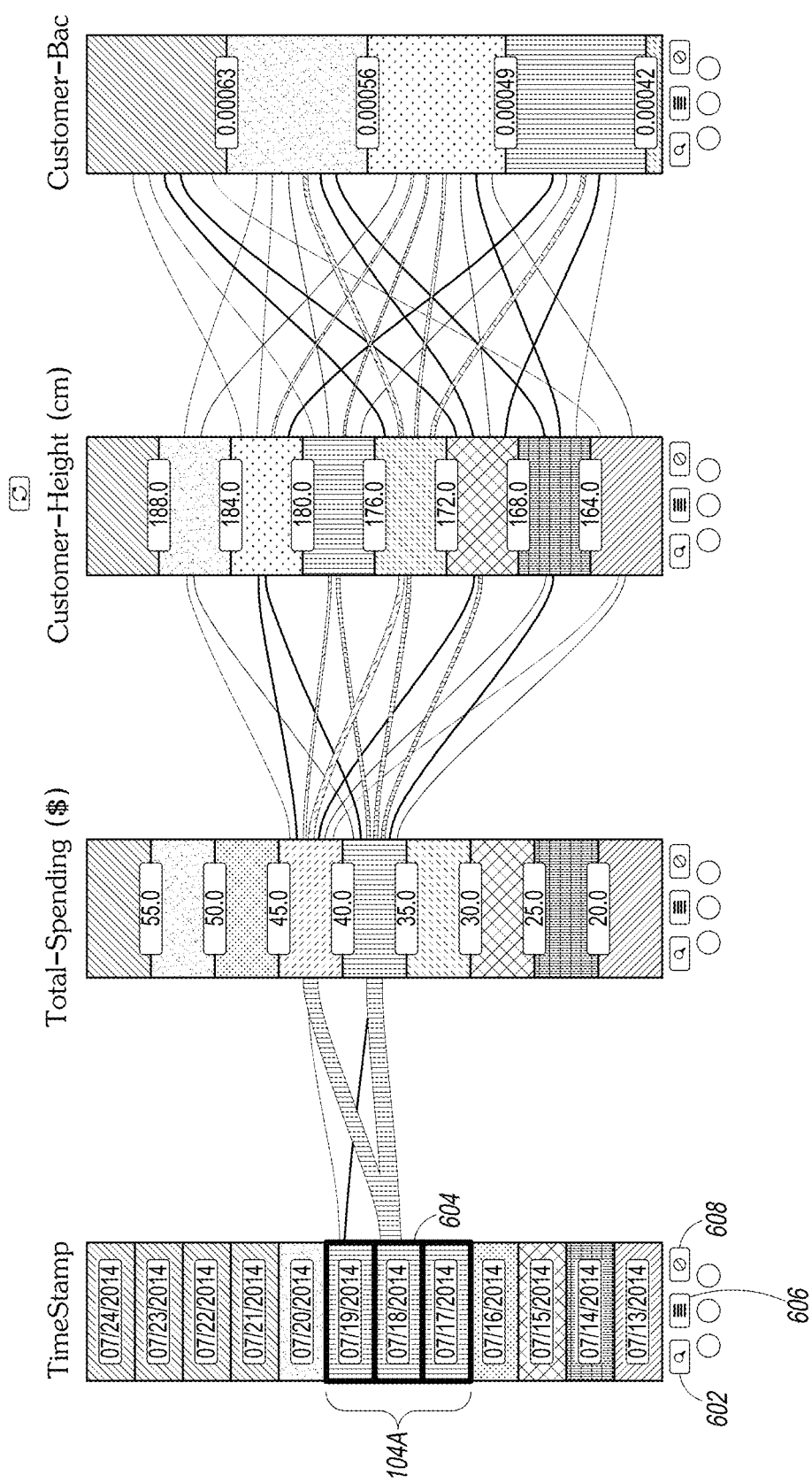
FIG. 6 shows a parallel coordinates plot with more granular regions in the left-most axis.

Certain embodiments contemplate that a user can scale the regions in a shape. For instance, a user can scale the regions in a shape by performing a zoom-in input operation. In the example of FIG. 6, a user clicked on region 104A to select the region, and clicked zoom button 602. The view (not shown) transitioned to present the week including Jul. 18, 2014, one week before, and one week after. The user then clicked recalculate button 606, to present additional, more granular data ranges based on the zoom level. In other words, after recalculation, additional data ranges (additional days) are presented with the current zoom level (the week including Jul. 18, 2014, one week before, and one week after). And, in response, the scaled shape 102A shows a larger number of regions and range of patterns than the original shape. The zoom-in operation allows a user to quickly drill down on the distribution of data originating from the time period of region 104A.

The user could reverse the foregoing operation by clicking restore button 608 to restore the original view. In response to relevant input operations, suitable program instructions stored on a non-transitory computer readable storage medium could be executed by a computer processor in order to cause the computing system of FIG. 20 to zoom out on region 604 of FIG. 6 or restore the original view, as selected.

Figure 7:
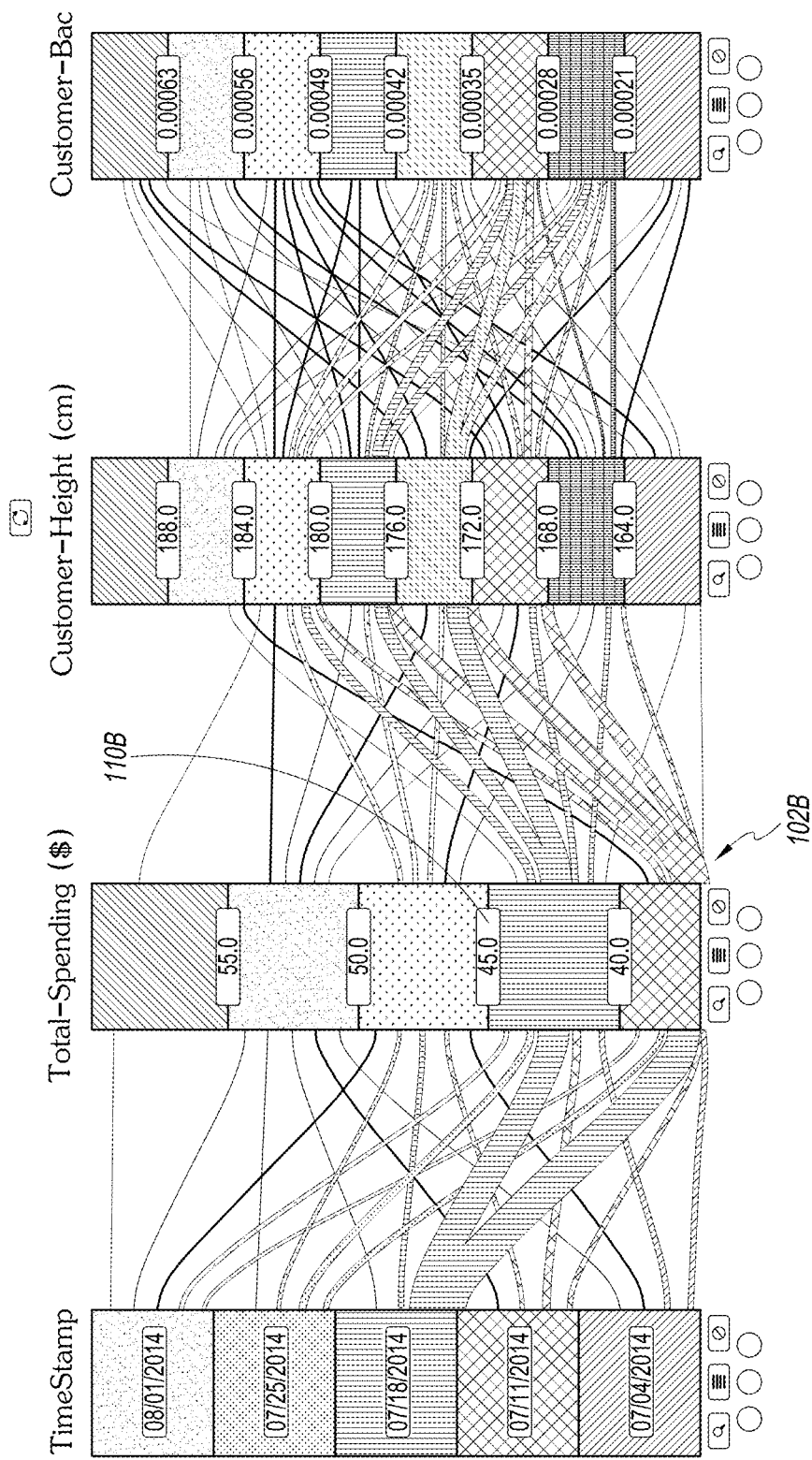
FIG. 7 shows a parallel coordinates plot with regions removed in the axis second from the left.

Certain embodiments also contemplate scaling the regions in a shape by manipulating the regions and/or shapes. In FIG. 7, a user clicked a textual label below the mid-point of shape 102B, such as label 110C of FIG. 1, and dragged the label downward. The term "dragged" (and the related words drag and dragging) is a broad term and is to be given its ordinary and customary meaning to a person of ordinary skill in the art (that is, it is not to be limited to a special or customized meaning) and includes, without limitation, pulling or otherwise moving. As used herein, "dragging" on an object on user interface 100 can involve moving a cursor while depressing a mouse button or holding a stylus or finger against a user input device such as a monitor, screen, or touchpad. In response to the input operation, suitable program instructions stored on a non-transitory computer readable storage medium are executed by a computer processor in order to cause the computing system of FIG. 20 to perform a desired operation on the object. In FIG. 4, the input operation is an instruction to remove regions on shape 102B that are less than about $35. Suitable program instructions can then be executed to cause the computing system to remove the depictions of the relevant regions from user interface 100. And, in response, the scaled shape 102B shows a smaller number of patterns than the original shape.

Between FIG. 1 and FIG. 7, the number of regions in shape 102B was reduced from nine to five, and instead of viewing the range between $15 and $60, the user is now viewing the range of total spending between about $35 and $60. The dragging operation allows a user to quickly focus on specific regions of a shape.

Figure 8:
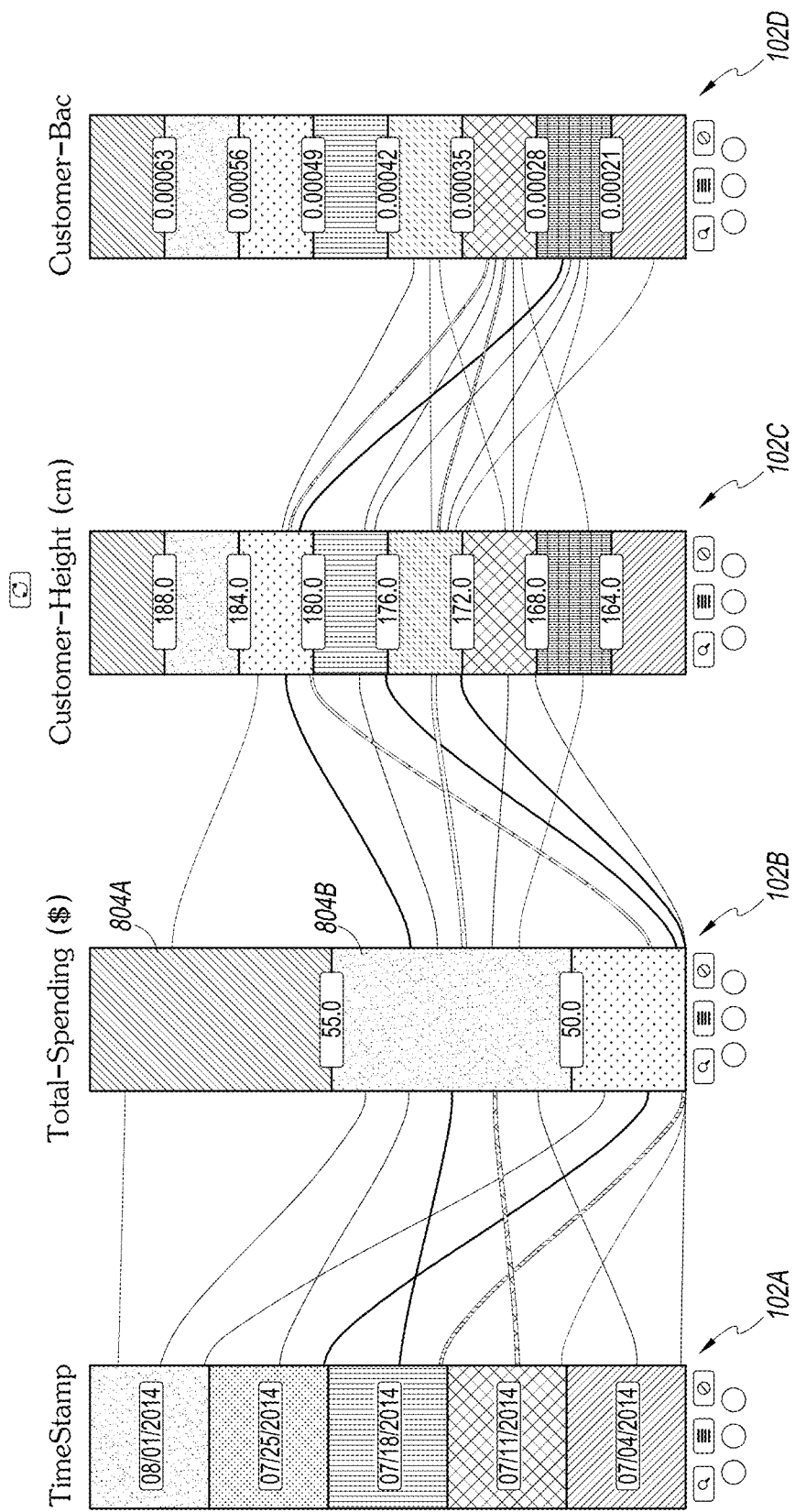
FIG. 8 shows a parallel coordinates plot with additional regions removed in the axis second from the left.

FIG. 8 further demonstrates scaling the regions of shape 102B by manipulating the regions. Here, a user clicked a textual label of FIG. 7 (for example, label 110B) and dragged the label downward. Between FIGS. 7 and 8, the number of displayed regions in shape 102B was reduced from five to three. As shown in FIG. 8, the regions need not be equally sized. FIG. 8 also emphasizes how a scaling operation can be an instruction to remove the depiction of certain curves on user interface 100. As the number of regions in shape 102B was reduced from 5 to 3, the number of curves upstream of shape 102B (that is, between shape 102A and shape 102B) and the number of curves downstream of shape 102B (that is, between shape 102B and 102C and between shape 102C and shape 102D) were reduced, as the data points comprising total spending less than about $48 were removed from the displayed data set.

It should be understood that other methods for scaling the regions in a shape are contemplated besides clicking on a label and dragging the label in a direction. For example, with reference still to FIG. 8, a user could position a cursor over a periphery between two regions (such as region 804A and region 804B). The act of positioning the cursor on the periphery of two regions could cause the display of a suitable icon such as an up/down arrow icon to show that the periphery represents and adjustable area. The user could then click on the periphery and drag the periphery in the desired direction to zoom in or out on particular regions.

Figure 9A:
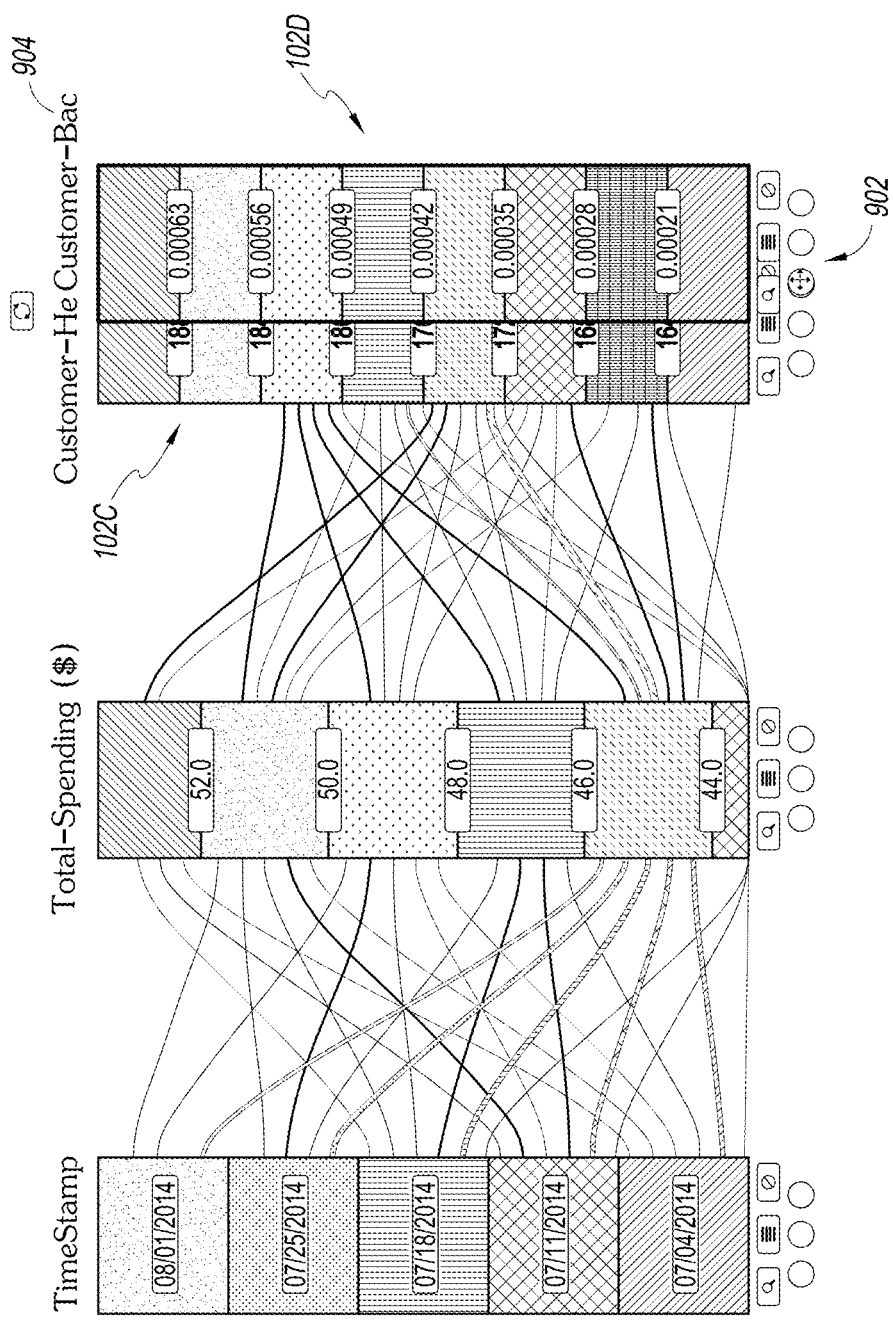
FIGS. 9A and 9B shows a method for repositioning an axis in a parallel coordinates plot.
Figure 9B:
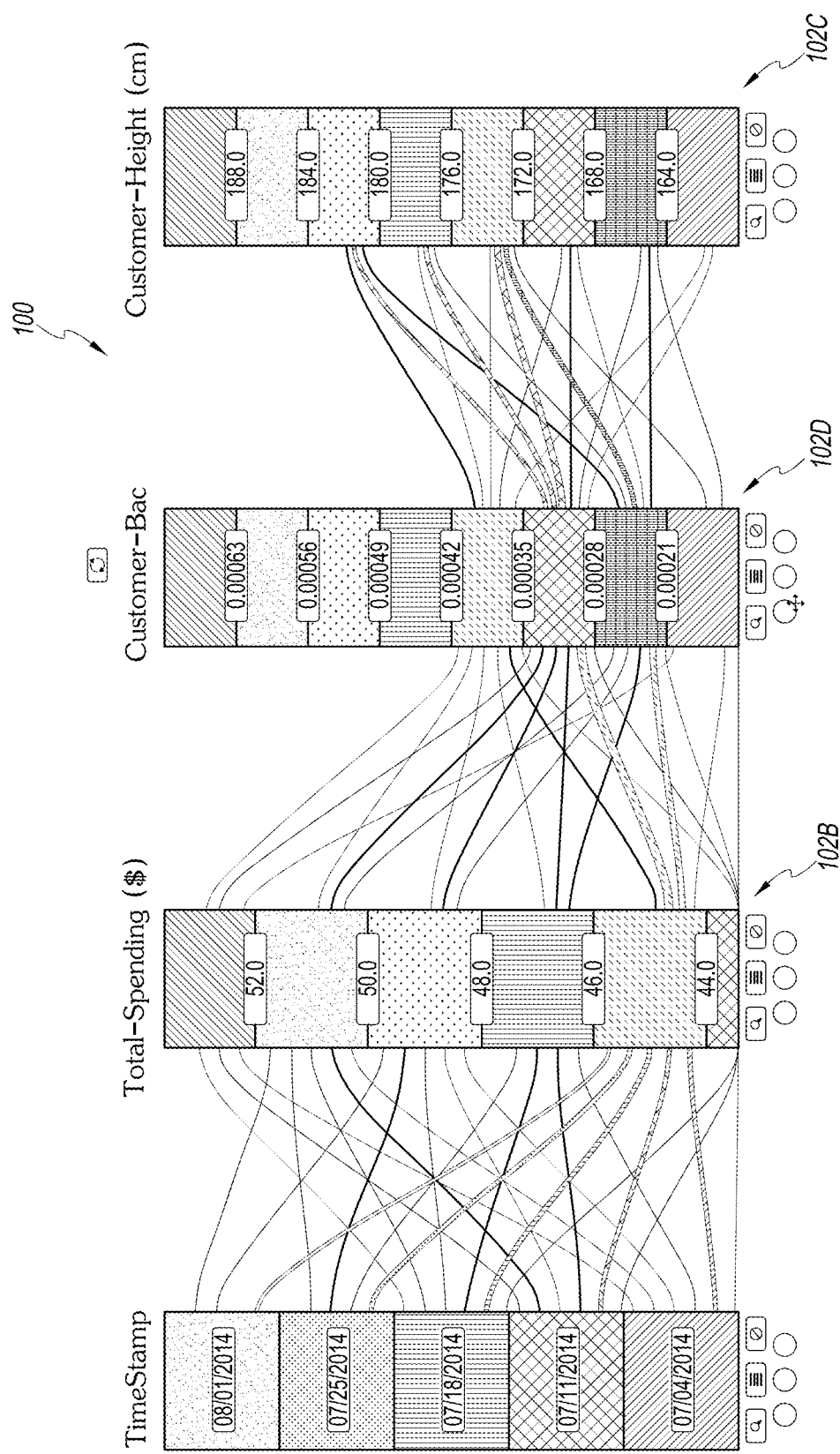

In at least one embodiment, a user can switch the positions of axes. With reference next to FIG. 9A, the user positions a cursor over a suitable area associated with shape 102D. For example, a user can position the cursor over move icon 902 or shape title 904. Alternatively, a user can position the cursor on a region within shape 102D. After positioning the cursor, the user can click and drag the cursor in a desired direction. In the example of FIG. 9A, the user drags the cursor toward shape 102C. As shown in FIG. 9B, after dragging the cursor sufficiently far toward shape 102C, the relative positions of shape 102C and 102D are switched. Suitable program instructions stored on a non-transitory computer readable storage medium are executed by a computer processor in order to cause the computing system of FIG. 20 to remove the original curves between shape 102B and 102C on user interface 100 and to generate and display curves between shape 102B and shape 102D.

In certain embodiments, a user can hide a shape that represents an uncorrelated or otherwise irrelevant variable. In this example data set, customer height is uncorrelated with the other three variables (timestamp, total spending, and customer BAC). Thus, a user may elect to hide shape 102C by executing an assigned operation, such as clicking on the shape and then clicking a hide icon (not shown) or depressing a predetermined key on a virtual or physical keyboard. Suitable program instructions stored on a non-transitory computer readable storage medium are executed by a computer processor in order to cause the computing system of FIG. 20 to hide the shape on user interface 100, to remove the original curves between that shape and an adjacent shape or shapes, and to generate and display curves between the shape to the left of the hidden shape and to the right of the hidden shape (if any).

Figure 10:
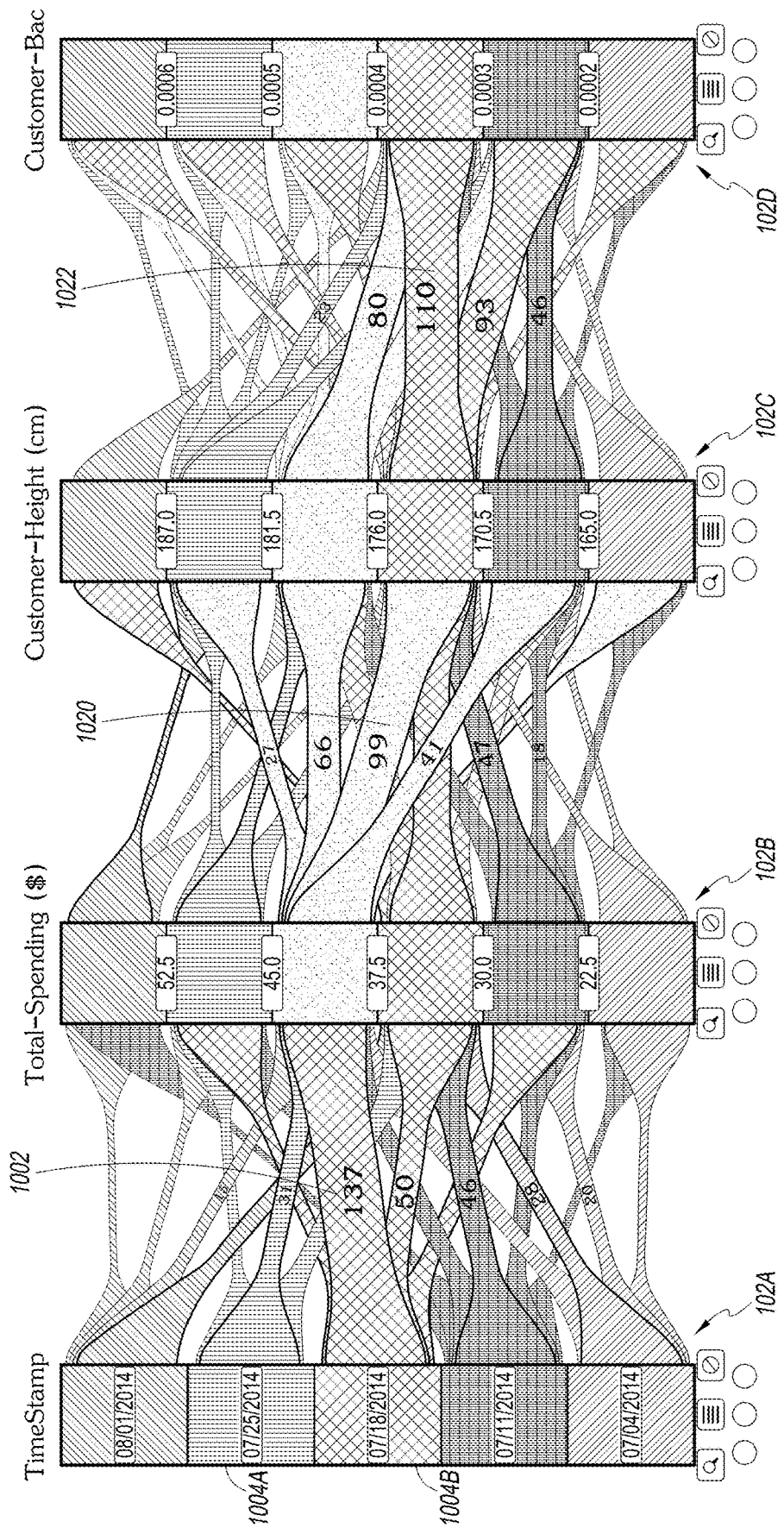
FIG. 10 shows a parallel coordinates plot according to at least one embodiment.

As discussed above, a curve can be thicker at the origin region and the end region and thinner in the space between the regions. FIG. 10 demonstrates how having thicker parts of the curves near the shapes emphasizes the particular region from which a curve originates or ends. Having the thinner part in the space between shapes, reflecting the aggregation of data corresponding to the value or the range of values of the variable associated with the origin region and the second value or the range of second values of the variable associated with the end region, accurately shows the amounts of data in the aggregated data between two regions.

FIG. 10 also demonstrates that, in at least one embodiment, a label 1002 displaying the number of data points represented in an aggregated curve can be displayed on user interface 100. It should be understood that such labels are not limited to embodiments having curves with non-uniform thickness between shapes. These labels can be incorporated in embodiments with uniform thickness curves, such as shown in FIG. 1. A label can be displayed for all curves. Desirably, to reduce visual clutter, a label is not displayed for all curves. For example, label can be displayed for a percentage of curves (such as the thickest 5% or 10% of curves) between two shapes. As another example, labels can be displayed for a number of curves (such as the six, eight, or ten thickest curves). As yet another example, labels can be displayed for curves containing a number of data points (such as curves containing 100 or more data points). The label can be placed on, at least partially on, or adjacent a curve so that a viewer can visually associate the label with the curve. Placing the label on the curve is advantageous because it reduces visual clutter between curves. Desirably, the position of the label can be skewed to generally track the direction of the curve. This configuration can emphasize the visual association between the label and the curve. Desirably, the criteria for displaying curves are configurable.

Figure 11:
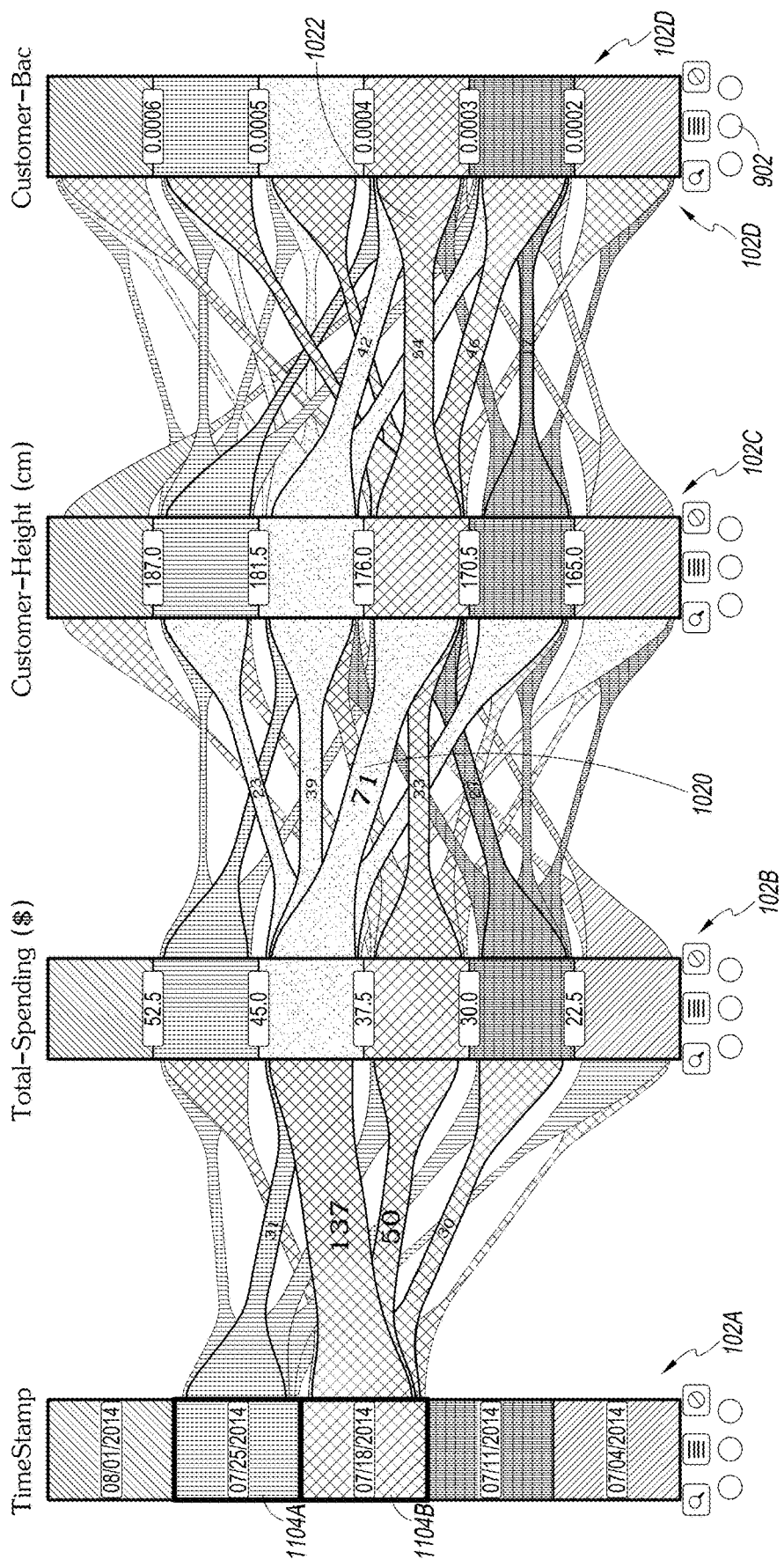
FIG. 11 shows a parallel coordinates plot with certain curves removed from the user display.

FIG. 11 demonstrates another example of a user transmitting instructions to remove the depiction of certain curves on user interface 100. In the example of FIG. 11, a user has clicked on region 1004A and region 1004B. The click operation caused the depiction of region 1004A and region 1004B to change. In FIG. 10, region 1004A and 1004B are displayed with regular outlining. In FIG. 11, region 1004A and region 1004B are displayed with bold outlining. The data originating from the other regions of shape 102A became hidden. This allows a user to more effectively visualize the distribution of data originating from the time periods of regions 1004A and 1004B.

FIG. 11 also emphasizes how removing the depiction of certain curves affects the depiction of downstream on user interface 100. In FIG. 10, curves originated from all five regions of shape 102A. In FIG. 11, curves originated from only two of the five regions of shape 102A. The number of data points in the downstream curves became adjusted accordingly. For example, the thickest curve (curve 1020) in the space between shape 102B and 102C contained 99 data points in FIG. 10. In FIG. 11, the corresponding curve (curve 1020) contained 71 data points. Similarly, the thickest curve (curve 1022) in the space between shape 102C and shape 102D contained 110 data points in FIG. 10. In FIG. 11, the corresponding curve (curve 1022) contained 54 data points. The number of data points in the downstream curves decreased because the data points comprising a time stamp other than the week including Jul. 18, 2014 and the week including Jul. 25, 2014 were removed from the displayed data set.

Figure 12:
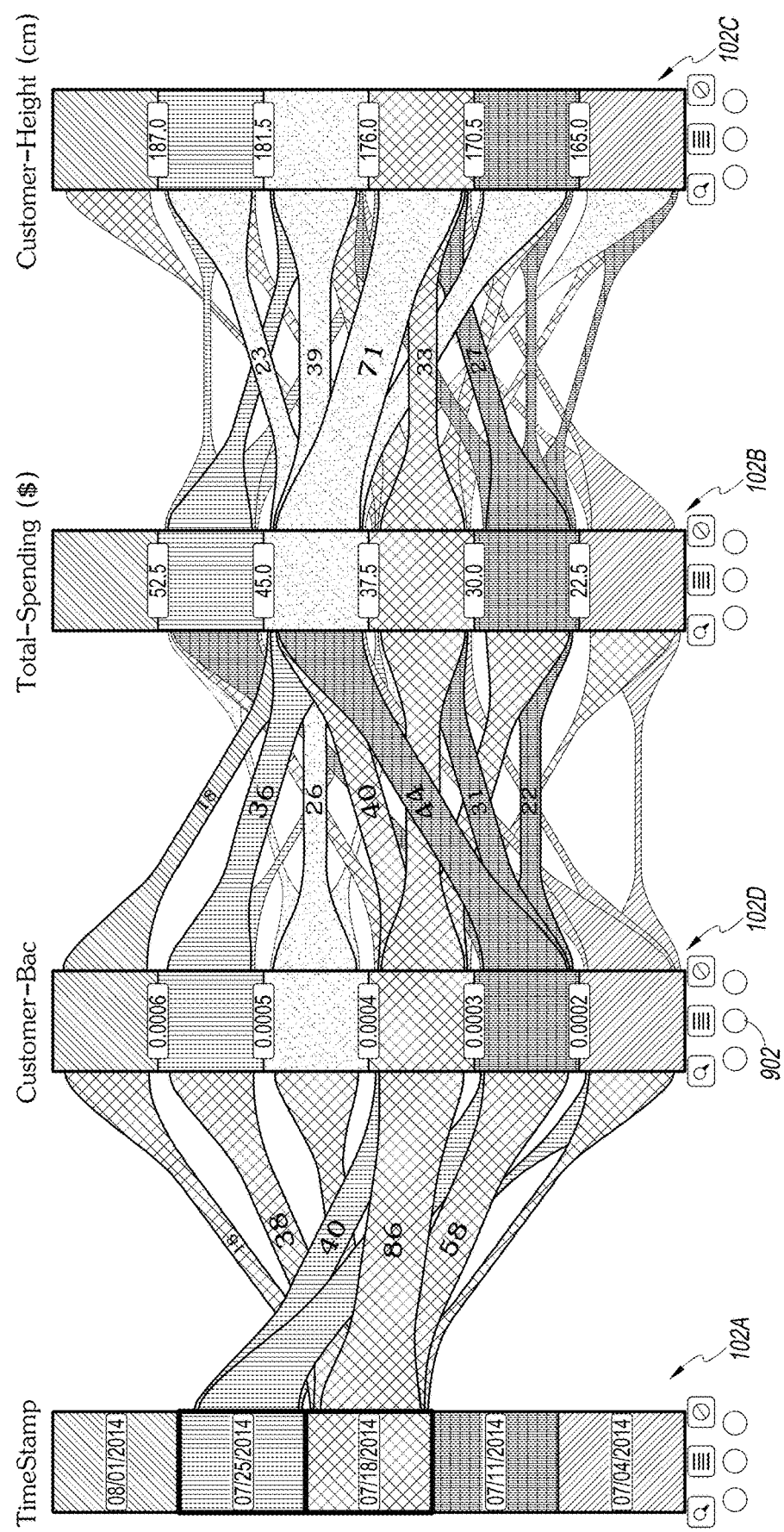
FIG. 12 shows a parallel coordinates plot with repositioned axes.

FIG. 12 again demonstrates that a user can switch the positions of axes. Between FIG. 11 and FIG. 12, a user has positioned a cursor over and clicked on a suitable area associated with shape 102D, such as move icon 902, and dragged the cursor toward shape 102B. Thus, in FIG. 12, shape 102D has taken the original position of shape 102B in FIG. 11, and shape 102B has been shifted to the right. The uncorrelated variable customer height (represented by shape 102C) now appears in a deemphasized rightmost position.

Figure 13:
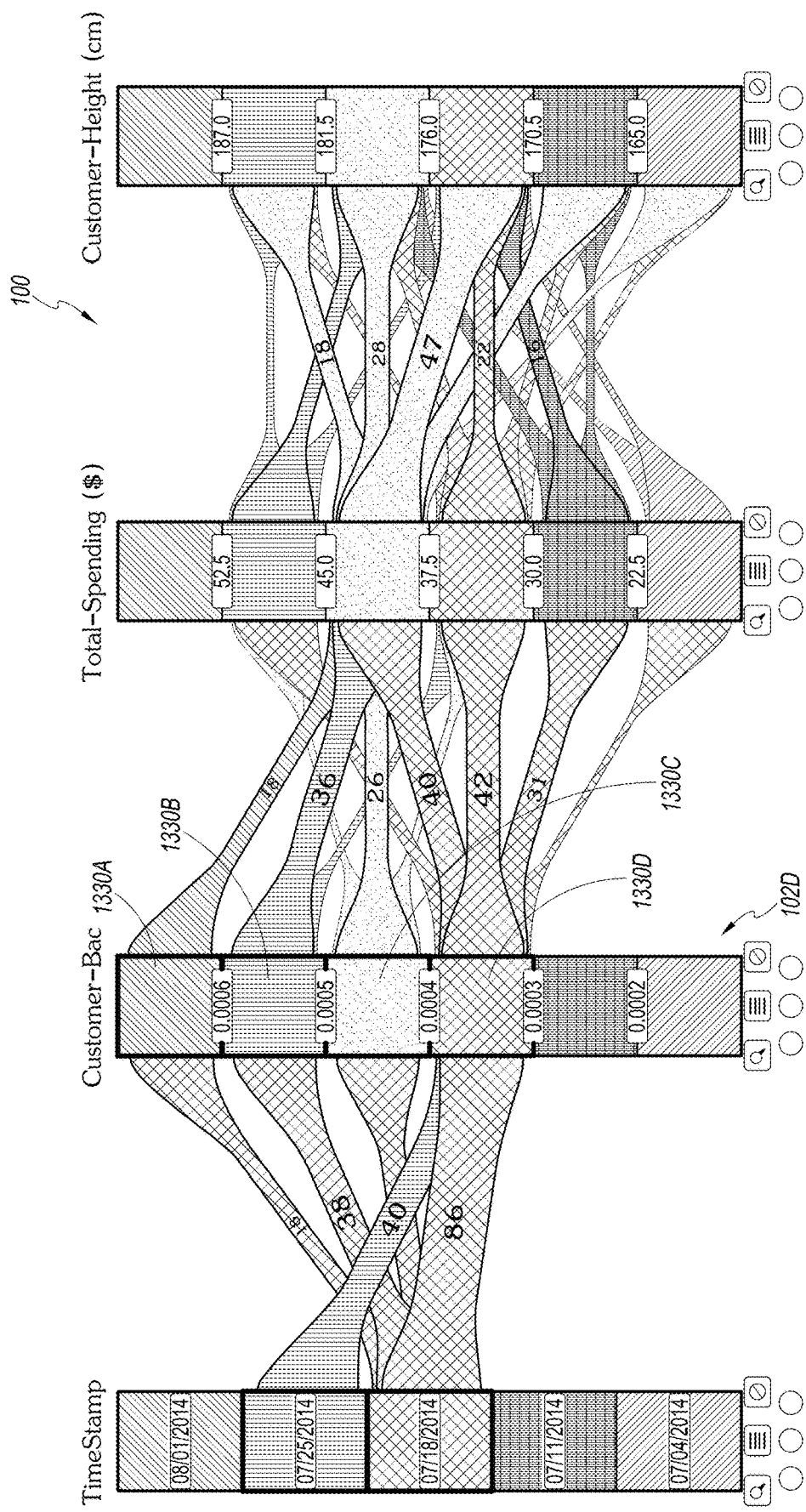
FIG. 13 shows a parallel coordinates plot with certain curves removed from the user display.

FIG. 13 yet again demonstrates removing the depiction of certain curves on user interface 100. In the example of FIG. 13, a user has clicked on region 1330A, region 1330B, region 1330C, and region 1330D. The click operation caused the depiction of region 1330A, region 1330B, region 1330C, and region 1330D to change by adding bold outlining. The data originating from the other regions of shape 102D became hidden. This allows a user to more effectively visualize the distribution of data originating from the customer BAC of region 1330A, region 1330B, region 1330C, and region 1330D. The number of data points in the downstream curves decreased because the data points comprising customer BAC less than 0.0003 were removed from the displayed data set.

Examining Relationships Between Variables

Certain embodiments allow a user to examine the relationship between two or more variables, by displaying the data on non-parallel or non-concentric axes. Example embodiments are discussed with reference to FIG. 14 through FIG. 19.

Figure 14:
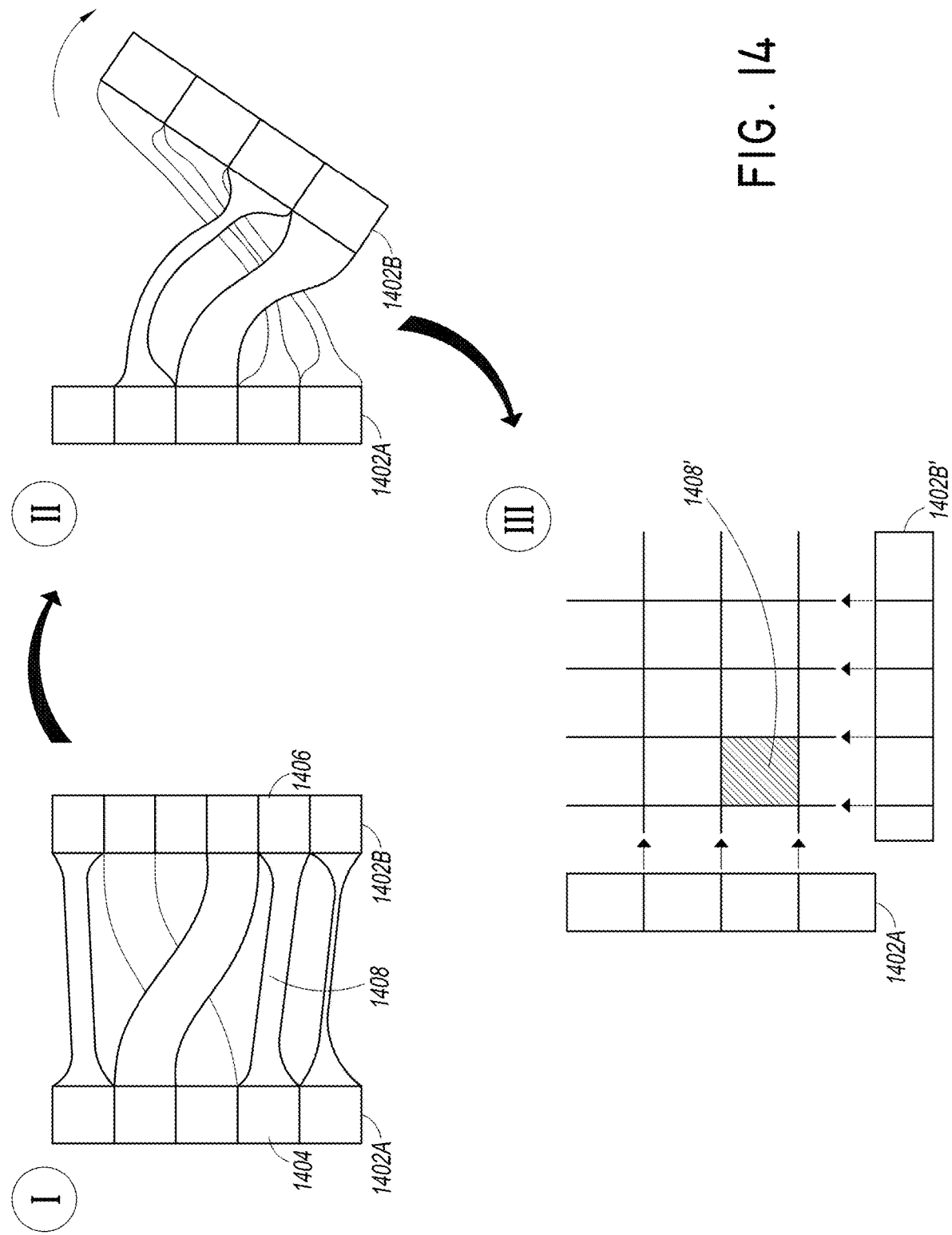
FIG. 14 shows a method for transforming two parallel axes to Cartesian axes.

View I of FIG. 14 shows two parallel shapes (shape 1402A and shape 1402B) on two parallel axes displaying aggregated curves in parallel coordinates. A user can select the two shapes and transmit a suitable command, such as a menu option selection or other suitable gesture, shortcut, or input, to view the shapes in Cartesian coordinates. View II demonstrates that, in response to the command, suitable program instructions stored on a non-transitory computer readable storage medium can be executed by a computer processor in order to cause the computing system of FIG. 20 to animate shape 1402B by tilting it from a parallel position toward a position perpendicular to shape 1402A. View III shows shape 1402A and shape 1402B' as the respective Y and X axes of a traditional Cartesian plot.

Figure 20:
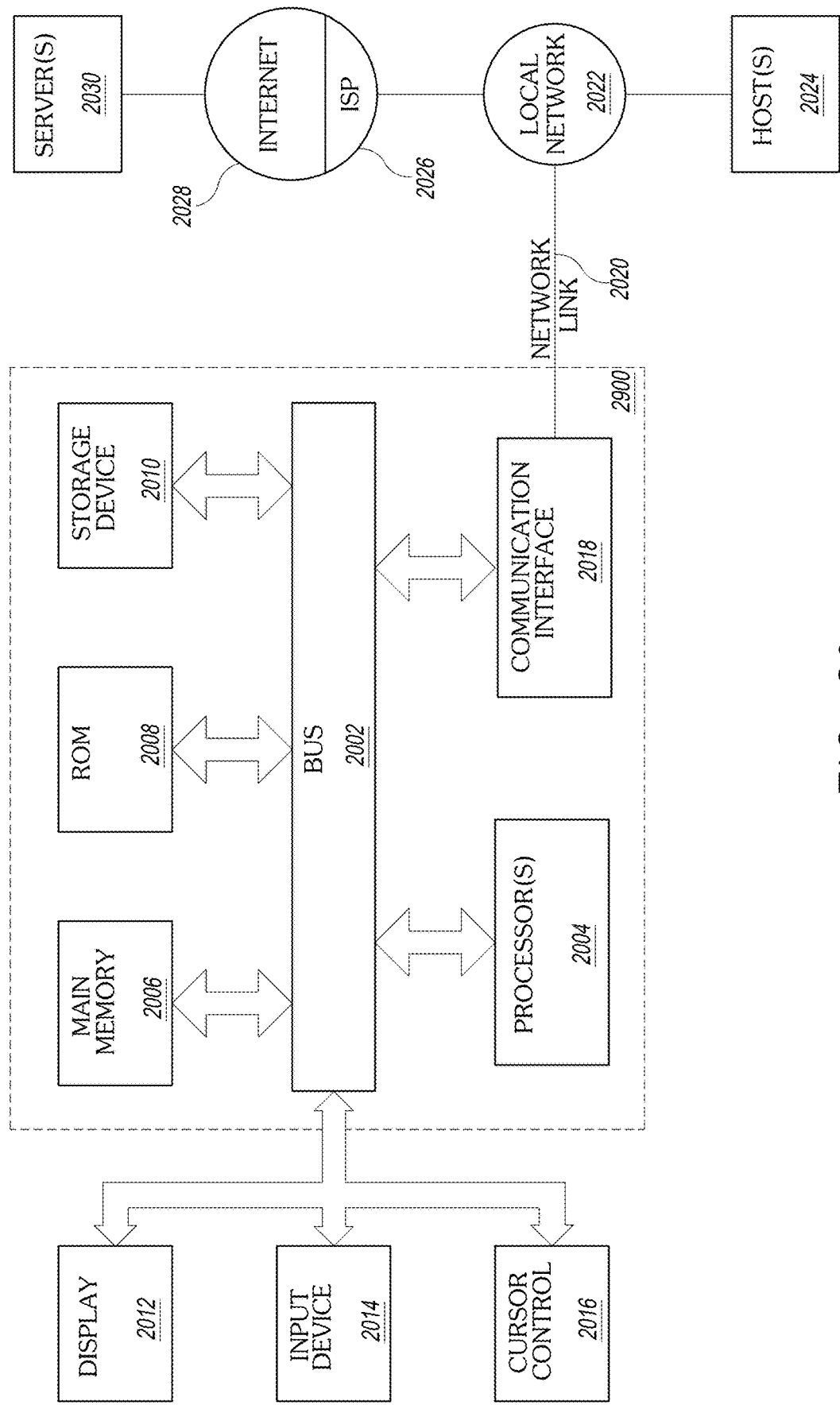
FIG. 20 illustrates a computer system with which certain methods discussed herein may be implemented.

Suitable program instructions stored on a non-transitory computer readable storage medium are further executed by a computer processor in order to cause the computing system of FIG. 20 to transform the curves between shape 1402A and shape 1402B in view I to a grid-like layout between shape 1402A and shape 1402B' in view III. The grid comprises a plurality of "squares." "Square" is a broad term and is to be given its ordinary and customary meaning to a person of ordinary skill in the art (that is, it is not to be limited to a special or customized meaning) and includes, without limitation, rectangles, quadrilaterals, and other suitable elements for a grid.

The thickness of line 1408 in view I can be translated to another visual representation in view III to highlight the differences between combinations of regions. Thus, in one or more embodiments, at least some of the squares of the grid include a visual representation of the number of data points corresponding to two regions in adjacent shapes. For example, line 1408 between region 1404 in shape 1402A and region 1406 in shape 1402B may visually represent an aggregation of 100 data points. In view III, square 1408' may include another visual representation of those 100 data points. For example, darker color intensities, more intense patterning, or darker grayscale intensities can be used to show squares with more data points. Other suitable visual differentiation can be used, such as hatching or some other technique visually differentiating the squares. Alternatively, or in combination with the aforementioned visual differentiation, the raw number of data points can be displayed in some or all of the squares with suitable labeling. It should be understood that some of the squares may not include labeling of the number of data points. For example, squares with a number of variables below a threshold value may be left blank. As another example, a percentage of squares may include such labeling, such as the squares representing the top 5% or 10% of number of data points.

Figure 15:
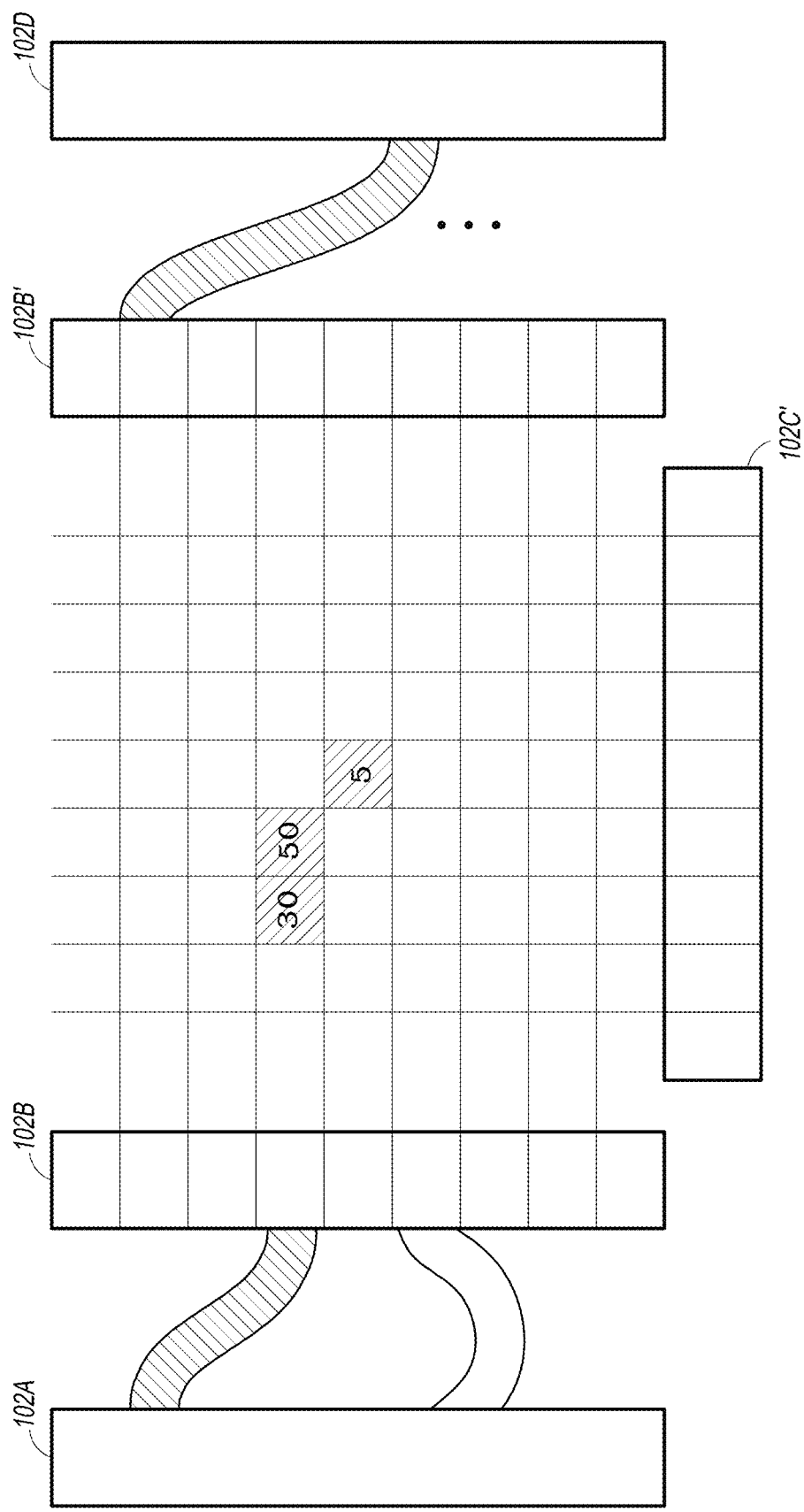
FIG. 15 shows a plot simultaneously displaying data in parallel coordinates and Cartesian coordinates.

The representation of FIG. 15 is similar to that of FIG. 14(III) and demonstrates an alternative configuration for incorporating the data view of FIG. 14(III) into a parallel coordinates plot as in FIG. 1. As discussed above, FIG. 1 shows four shapes corresponding to four variables, displayed in parallel coordinates. A user can select the two shapes (e.g., shape 102B and shape 102C) and transmit a suitable command, such as a menu option selection, to view the shapes in Cartesian coordinates. In certain embodiments, suitable program instructions stored on a non-transitory computer readable storage medium can then be executed by a computer processor in order to transform the configuration of FIG. 1 so that the user can examine the relationship between total spending (represented by shape 102B) and customer height (represented by shape 102C), for example.

In FIG. 15, shape 102A and shape 102B are retained in their original positions. Shape 102C of FIG. 1, designated shape 102C' in FIG. 15, is moved from the original parallel-coordinates axis position to the X-axis position of a Cartesian plot. The animation discussed in relation to FIG. 14 optionally can be incorporated into the movement. Shape 102B in FIG. 15 can be repeated, in the relative position of original shape 102C. Here, repeated shape 102B is designated 102B'. Shape 102D is also retained in its original position. Suitable program instructions can further be executed in order to cause the computing system of FIG. 20 to remove the original curves between shape 102C and shape 102D on user interface 100 and to generate and display curves between shape 102B' and shape 102D. The grid between shape 102B and shape 102C is essentially the same as in FIG. 14(III), and the foregoing discussion thereof is incorporated by reference.

Figure 16:
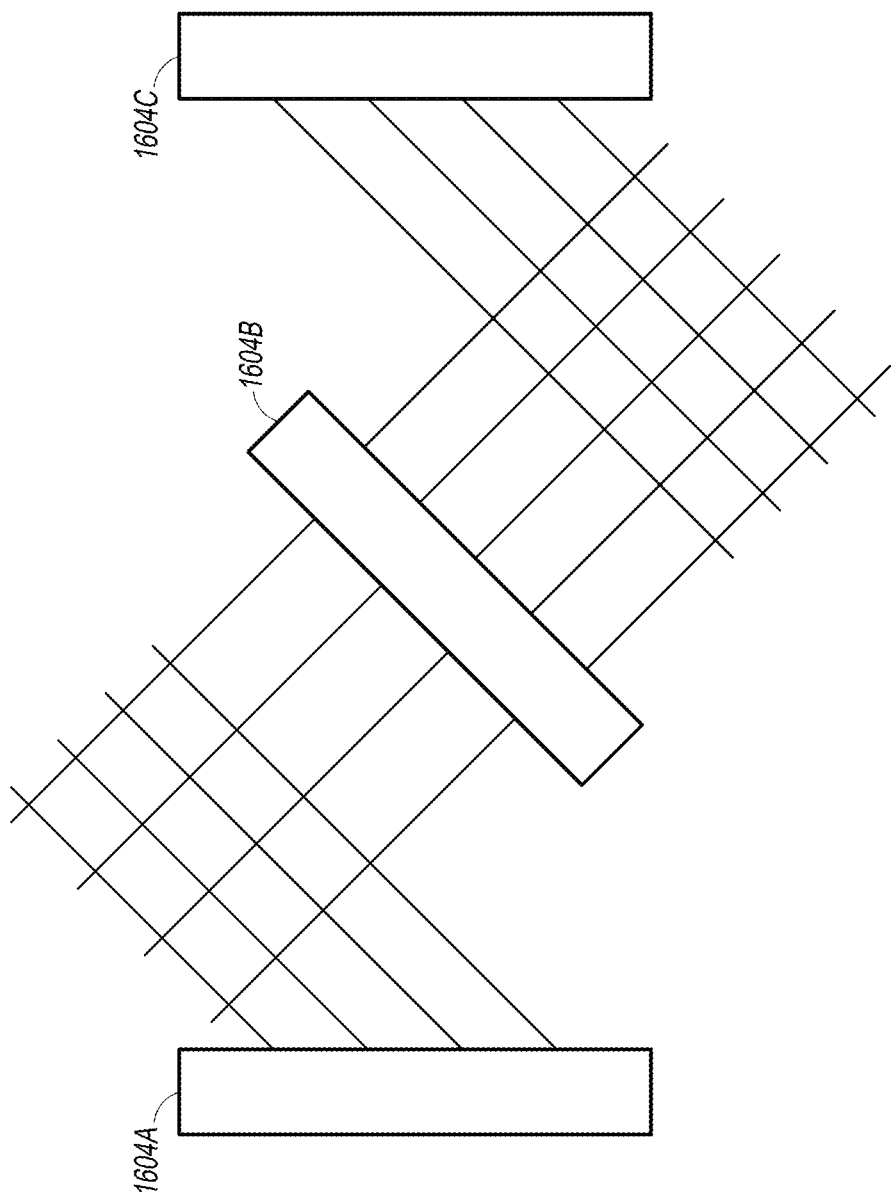
FIG. 16 shows a plot simultaneously displaying data for three variables incorporating a non-parallel axis and diamond-shaped grid elements.

FIG. 16 represents a modification and expansion on the configuration of FIG. 14(III). FIG. 16 displays three shapes (axes) rather than two shapes (axes) as in FIG. 14(III). A user could select three axes (e.g., as shown in FIG. 1) and transmit a suitable command, such as a menu option selection, to view the shapes in Cartesian coordinates. In FIG. 16, suitable program instructions stored on a non-transitory computer readable storage medium are executed by the computer processor of FIG. 20 in order to transform three parallel coordinate axis shapes to help the user simultaneously examine the relationship between three variables. Two parallel axes shapes (shape 1604A and 1604C) are retained in their original parallel configuration. A third axis shape 1604B is rotated from its original parallel configuration such that shape 1604B is not parallel to shape 1604A and shape 1604C. The animation discussed in relation to FIG. 14 optionally can be incorporated into the movement. Here, shape 1604B is offset from shape 1604A and shape 1604C at an angle, such as a 45° angle. The diamond-shaped grid between shape 1604A and shape 1604B, and the diamond-shaped grid between shape 1604B and shape 1604C are essentially the same as in FIG. 14(III), and the foregoing discussion thereof is incorporated by reference.

The configuration of FIG. 16 is not limited to three axes. Additional axes can be incorporated by alternating parallel and offset axes. In addition, the configuration of FIG. 16 optionally can be incorporated into a parallel coordinates layout, as described with reference to FIG. 15.

The foregoing examples show the transformation of parallel coordinate plots into Cartesian coordinate plots that allow a user to examine the relationship between two (or more) variables. Nevertheless, certain embodiments can incorporate non-Cartesian coordinate plots, as discussed below with reference to FIGS. 17 and 18.

Figure 17:
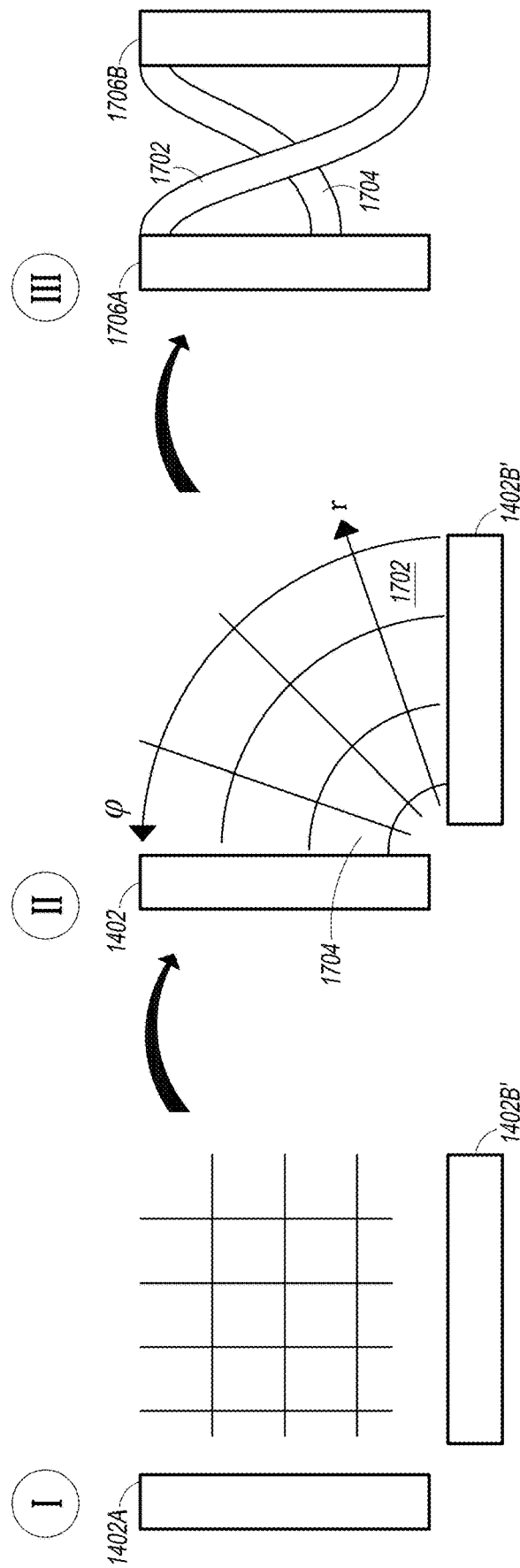
FIG. 17 shows a method for transforming a Cartesian coordinate plot to a polar coordinate plot, and using data selected in the polar coordinates plot in a parallel coordinates plot.

Turning first to FIG. 17, view I shows the grid of FIG. 14(III) in Cartesian coordinates. A user can transmit a suitable command, such as a menu option selection, to view the shapes in polar coordinates. View II shows the grid transformed into polar coordinates instead of Cartesian coordinates. A polar coordinate view can be advantageous for analyzing data that is tied to direction and length from a center point, such as aircraft navigation data, microphone pickup patterns, gravitational fields, and systems with point sources, such as radio antennas.

In view II, radius (r) is related to the Cartesian coordinates according to the relationship:

$$r=\sqrt{x^2+y^2}.$$

And angle ($\varphi$) is related to the Cartesian coordinates according to the relationship:

$$\varphi = \begin{cases} \arctan\left(\frac{y}{x}\right) & \text{if } x > 0 \\ \arctan\left(\frac{y}{x}\right)+\pi & \text{if } x < 0 \text{ and } y \geq 0 \\ \arctan\left(\frac{y}{x}\right)-\pi & \text{if } x < 0 \text{ and } y < 0 \\ \frac{\pi}{2} & \text{if } x = 0 \text{ and } y > 0 \\ -\frac{\pi}{2} & \text{if } x = 0 \text{ and } y < 0 \\ \text{undefined} & \text{if } x = 0 \text{ and } y = 0 \end{cases}$$

The resulting grid of view II is essentially the same as the grid of FIG. 14(III), and the foregoing discussion thereof is incorporated by reference. The primary difference is that, in FIG. 14(III), the squares can be defined in terms of an X and Y axis. In view II of FIG. 17, the squares can be defined in terms of radius (r) and angle $\varphi$.

View III of FIG. 17 again displays the data in parallel coordinates, but the parallel axes 1706A, 1706B have been scaled in terms of regions 1702, 1704 selected in view II. It should be understood that the configuration of FIG. 17 optionally can be incorporated into a parallel coordinates layout, as described with reference to FIG. 15.

Figure 18A:
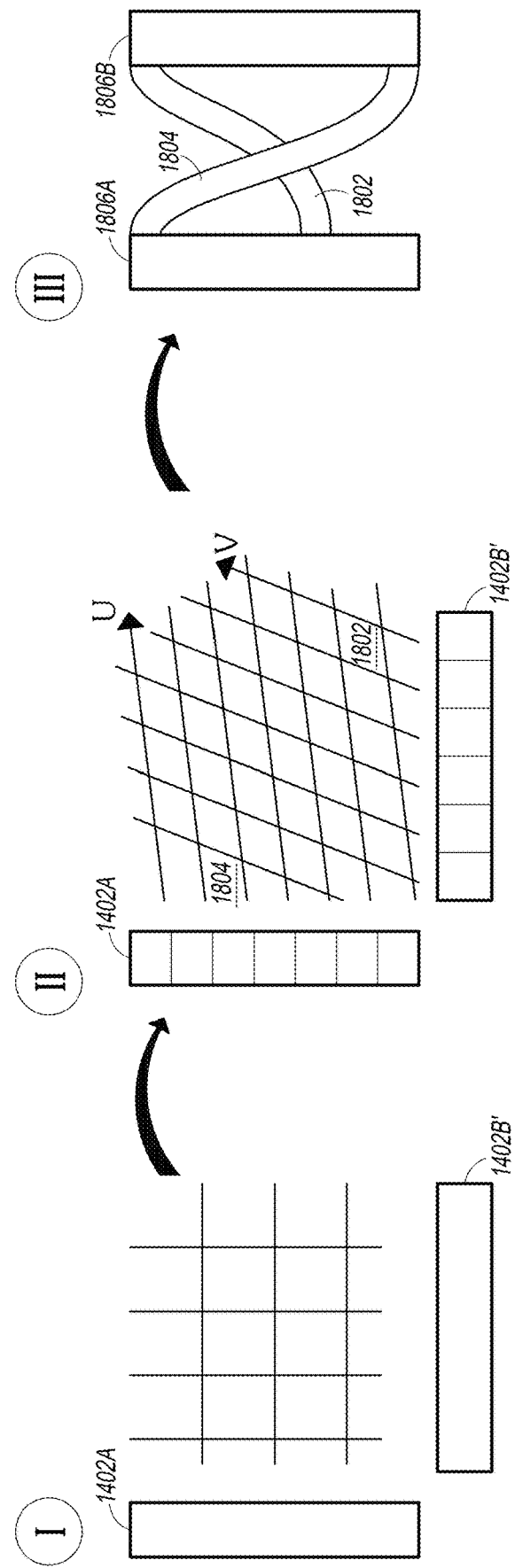
FIG. 18A shows a method for transforming a Cartesian coordinate plot to a skew coordinate plot, and using data selected in the skew coordinates plot in a parallel coordinates plot.

FIG. 18A shows another example incorporating a non-Cartesian coordinate plot for examining the relationship between variables. FIG. 18A is similar to FIG. 17, except that view II of FIG. 18A shows data plotted in skew coordinates instead of in polar coordinates, as in FIG. 17(II). A skew-coordinates plot can advantageous for investigating linear dependence between variables.

Figure 18B:
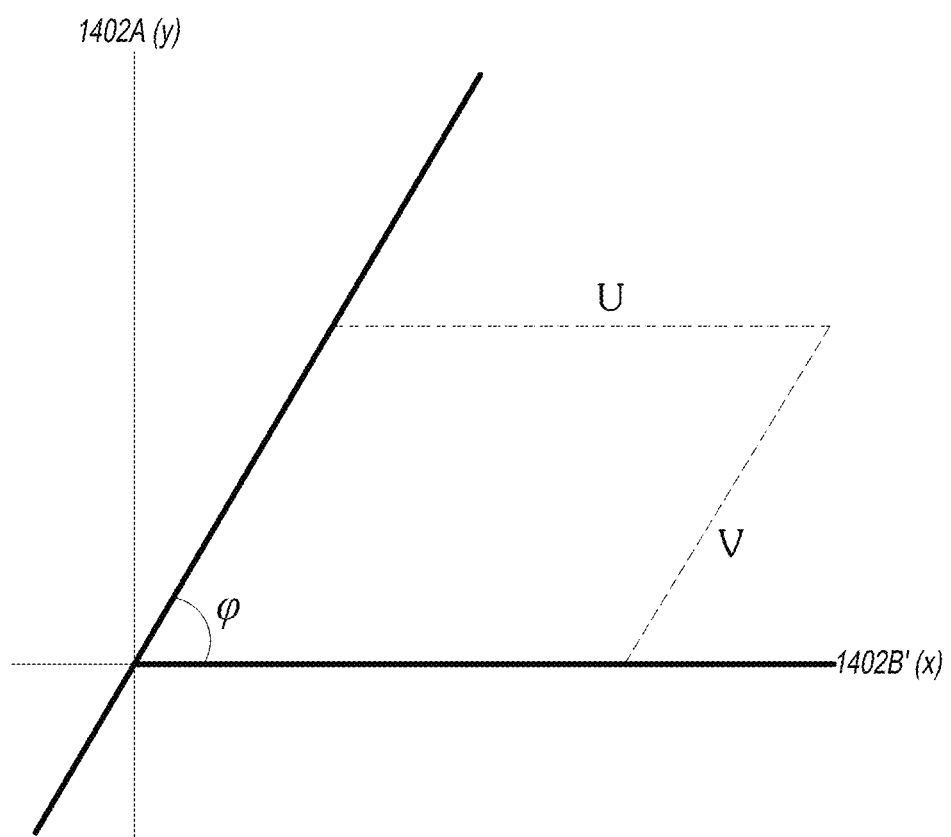
FIG. 18B shows an example relationship of the skew coordinate system and the Cartesian system of FIG. 18A.

The grid of view II is essentially the same as the grid of FIG. 14(III), and the foregoing discussion thereof is incorporated by reference. The primary difference is that, in FIG. 14(III), the squares can be defined in terms of X and Y axes. In view II of FIG. 17, the squares can be defined in terms of U and V axes skewed by angle co. FIG. 18B shows a greater detail of an oblique coordinate system (U, V) skewed by angle co and sharing an origin with Cartesian system (X, Y), as depicted in FIG. 18A(II). The example skew coordinate system (U, V) is related to the Cartesian coordinates (X, Y) according to the relationships:

$$X=u+v \cos \varphi$$

$$Y=v \sin \varphi$$

View III of FIG. 18A again displays the data in parallel coordinates, but the parallel axes 1806A, 18068 have been scaled in terms of regions 1802, 1804 selected in view II. It should be understood that the configuration of FIG. 18A optionally can be incorporated into a parallel coordinates layout, as described with reference to FIG. 15. Moreover, it should be understood that alternative skew coordinate systems can be incorporated in various embodiments.

Figure 19:
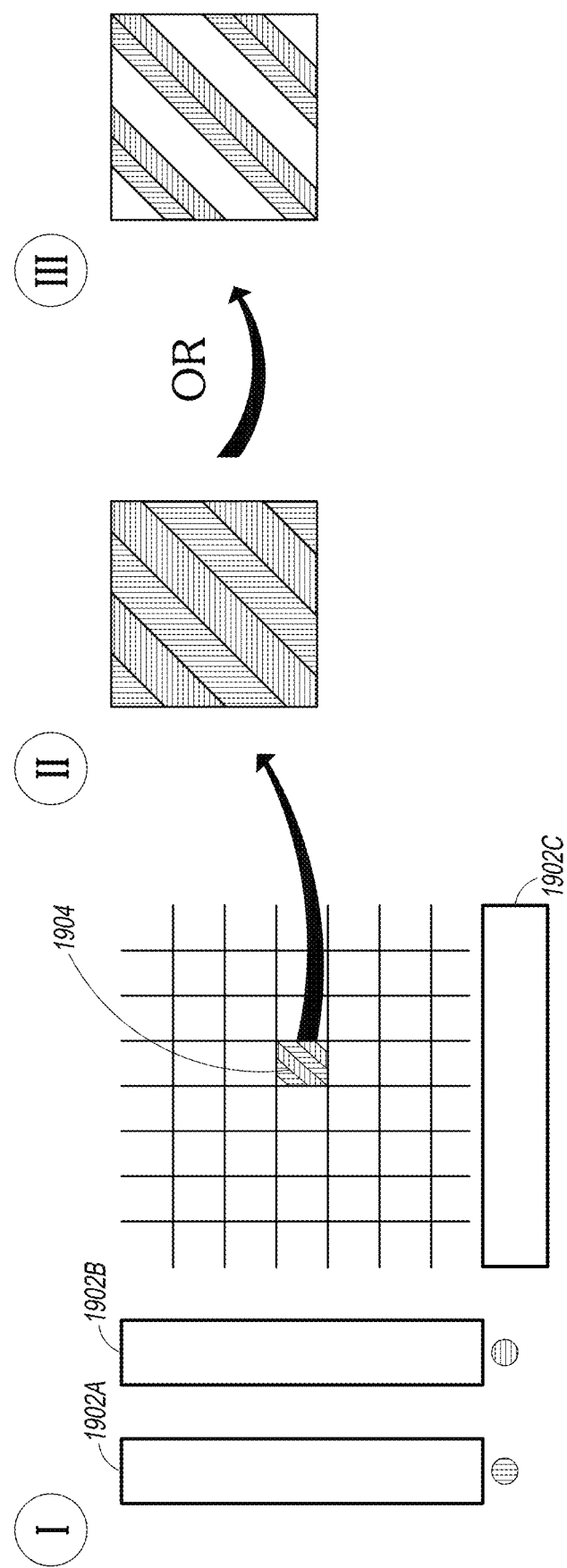
FIG. 19 shows a plot simultaneously displaying data for three or more variables in Cartesian coordinates.

FIG. 19 demonstrates a modified Cartesian coordinate plot simultaneously showing a relationship between three or more variables. A user can access this plot by selecting three shapes (e.g., as shown in FIG. 1) and transmitting a suitable command, such as a menu option selection, to view the shapes in Cartesian coordinates. In view I, shapes 1902A and 1902B are shown in the Y-axis position and shape 1902C is shown in a perpendicular X-axis position. It should be understood that additional shapes can be shown in the Y-axis position. A grid is displayed between the perpendicular axes. Each square, such as square 1904, of the resulting grid reflects aggregations of data for the two (or more) variables represented by shape 1902A and shape 19028 for each region of shape 1902C. For example, as shown in view II, within each square of the grid, two (or more) patterns can be used to represent each of the Y-axis variables (corresponding to shape 1902A and shape 1902B). The intensity of the pattern can reflect the relative number of data points within a particular square. Of course, other visual differentiation can be used, such as color, grayscale shading, hatching, and the like. As another example, as shown in view III, a plurality of stripes can be used to represent the Y-axis variables. The thickness of the stripes can reflect the relative number of data points within a particular square. The configuration of FIG. 19 can be incorporated into a parallel coordinates layout, as described with reference to FIG. 15.

It should be understood that suitable means for examining the relationship between two or more variables by displaying the data on non-parallel or non-concentric axes are not limited to the foregoing examples. Other coordinate systems, such as logarithmic, exponential, log-polar, cylindrical, and the like are contemplated and can be selected based on the underlying data.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 20 is a block diagram that illustrates a computer system 2000 upon which an embodiment may be implemented. For example, any of the computing devices discussed herein, such as the user interface 100 may include some or all of the components and/or functionality of the computer system 2000.

Computer system 2000 includes a bus 2002 or other communication mechanism for communicating information, and a hardware processor, or multiple processors, 2004 coupled with bus 2002 for processing information. Hardware processor(s) 2004 may be, for example, one or more general purpose microprocessors.

Computer system 2000 also includes a main memory 2006, such as a random access memory (RAM), cache and/or other dynamic storage devices, coupled to bus 2002 for storing information and instructions to be executed by processor 2004. Main memory 2006 also may be used for storing temporary variables or other intermediate information during execution of instructions to be executed by processor 2004. Such instructions, when stored in storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk, optical disk, or USB thumb drive (Flash drive), etc., is provided and coupled to bus 2002 for storing information and instructions.

Computer system 2000 may be coupled via bus 2002 to a display 2012, such as a cathode ray tube (CRT) or LCD display (or touch screen), for displaying information to a computer user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 2000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor(s) 2004 executing one or more sequences of one or more instructions contained in main memory 2006. Such instructions may be read into main memory 2006 from another storage medium, such as storage device 2010. Execution of the sequences of instructions contained in main memory 2006 causes processor(s) 2004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 2010. Volatile media includes dynamic memory, such as main memory 2006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid state drive of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 may retrieve and execute the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card, cable modem, satellite modem, or a modem to provide a data communication connection to a corresponding type of telephone line. As another example, communication interface 2018 may be a local area network (LAN) card to provide a data communication connection to a compatible LAN (or WAN component to communicated with a WAN). Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code may be executed by processor 2004 as it is received, and/or stored in storage device 2010, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments. In addition, the inventions illustratively disclosed herein suitably may be practiced in the absence of any element which is not specifically disclosed herein.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
one or more processors; and
a non-transitory computer readable storage medium storing program instructions configured to be executed by the one or more processors to cause the computing system to:
   generate data useable for rendering a user interface including:
      a first shape representing a first variable of multivariate data, the first shape representing a first range of values of the first variable;
      a second shape representing a second variable of the multivariate data, the second shape representing a second range of values to the second variable;
      a third shape representing a third variable of the multivariate data, the third shape representing a third range of values of the third variable;
      a first curve extending from a first periphery portion of the first shape to a first periphery portion of the second shape, wherein the first curve has a thickness proportional to a quantity of the multivariate data represented by the first curve; and
      a second curve extending from a second periphery portion of the second shape to a first periphery portion of the third shape;
   receive a user interaction with the third shape causing a change to the third range of values; and
   in response to the user interaction with the third shape, transmit data for updating the thickness of the first curve.

2. The computing system of claim 1, wherein the first shape represents a first axis for the first variable, the non-transitory computer readable storage medium storing program instructions configured to be executed by the one or more processors to further cause the computing system to:
   transmit data to update the user interface to include a textual label within the first shape, the textual label corresponding to a sub-range of values that are within the first range.

3. The computing system of claim 2, wherein the first periphery portion of the first shape corresponds to the sub-range of values for the first variable, and wherein the thickness of the first curve is reduced to be proportional to a number of the multivariate data that fall within the sub-range of values for the first variable, within the second range for the second variable, and within a subset of the third range for the third variable.

4. The computing system of claim 3, the non-transitory computer readable medium storing program instructions configured to be executed by the one or more processors to further cause the computing system to:
   in response to a user interaction with an option, transmit data remove the second curve from the user interface; and
   transmit data to display a plurality of curves extending from the second periphery portion of the second shape, a quantity of the plurality of curves being the number of the multivariate data that fall within the sub-range of values for the first variable, within the second range for the second variable, and within a subset of the third range for the third variable.

5. The computing system of claim 1, the non-transitory computer readable medium storing program instructions configured to be executed by the one or more processors to further cause the computing system to:
   include, in the user interface:
      a first shape corresponding to a first axis for the first variable;
      a second shape corresponding to a second axis for the second variable;
      a third shape corresponding to a third axis for the third variable; and
      a plurality of textual labels within the third shape, wherein the plurality of textual labels span values across the third range; and
   in response to the user interaction with the third shape, change the plurality of textual labels to span values across a subset of the third range.

6. The computing system of claim 1, the non-transitory computer readable medium storing program instructions configured to be executed by the one or more processors to further cause the computing system to receive a first user instruction to:
   receive a user interaction switching a position of the third shape with a position of the second shape; and
   in response to the user interaction switching the position of the third shape with the position of the second shape:
      remove the first and second curves from the user interface;
      include a third curve extending from the first periphery portion of the first shape to the first periphery portion of the third shape; and
      include a fourth curve extending from a second periphery portion of the third shape to the first periphery portion of the second shape.

7. A computer-implemented method comprising:
by one or more processors executing program instructions:
   generating data useable for rendering a user interface including:
      a first shape representing a first variable of multivariate data, the first shape representing a first range of values of the first variable;
      a second shape representing a second variable of the multivariate data, the second shape representing a second range of values to the second variable;
      a third shape representing a third variable of the multivariate data, the third shape representing a third range of values of the third variable;
      a first curve extending from a first periphery portion of the first shape to a first periphery portion of the second shape, wherein the first curve has a thickness proportional to a quantity of the multivariate data represented by the first curve; and
      a second curve extending from a second periphery portion of the second shape to a first periphery portion of the third shape;
   receiving a user interaction with the third shape causing a change to the third range of values; and
   in response to the user interaction with the third shape, transmitting data for updating the thickness of the first curve.

8. The computer-implemented method of claim 7, wherein the first shape represents a first axis for the first variable, and wherein the method further comprises:
by the one or more processors executing program instructions:
   transmitting data to update the user interface to include a textual label within the first shape, the textual label corresponding to a sub-range of values that are within the first range.

9. The computer-implemented method of claim 8, wherein the first periphery portion of the first shape corresponds to the sub-range of values for the first variable, and wherein the thickness of the first curve is reduced to be proportional to a number of the multivariate data that fall within the sub-range of values for the first variable, within the second range for the second variable, and within a subset of the third range for the third variable.

10. The computer-implemented method of claim 9, further comprising:
by the one or more processors executing program instructions:
in response to a user interaction with an option, removing the second curve from the user interface; and
transmitting data to display a plurality of curves extending from the second periphery portion of the second shape, a quantity of the plurality of curves being the number of the multivariate data that fall within the sub-range of values for the first variable, within the second range for the second variable, and within a subset of the third range for the third variable.

11. The computer-implemented method of claim 7 further comprising:
by the one or more processors executing program instructions:
depicting, in the user interface:
a first shape corresponding a the first axis for the first variable;
a second shape corresponding to a second axis for the second variable;
a third shape corresponding to a third axis; and
a plurality of textual labels within the third shape, the plurality of textual labels spanning values across the third range; and
in response to the user interaction with the third shape, changing the plurality of textual labels to span values across a subset of the third range.

12. The computer-implemented method of claim 7 further comprising:
by the one or more processors executing program instructions:
receiving a user interaction switching a position of the third shape with a position of the second shape; and
in response to the user interaction switching the position of the third shape with the position of the second shape:
removing the first and second curves from the user interface;
including a third curve extending from the first periphery portion of the first shape to the first periphery portion of the third shape; and
including a fourth curve extending from a second periphery portion of the third shape to the first periphery portion of the second shape.

13. A non-transitory computer-readable medium comprising one or more program instructions recorded thereon, the program instructions configured for execution by a computing system comprising one or more processors to cause the computing system to:
transmit data useable for rendering for generating a user interface including:
a first shape representing a first variable of multivariate data, the first shape representing a first range of values of the first variable;
a second shape representing a second variable of the multivariate data, the second shape representing a second range of values to the second variable;
a third shape representing a third variable of the multivariate data, the third shape representing a third range of values of the third variable;
a first curve extending from a first periphery portion of the first shape to a first periphery portion of the second shape, wherein the first curve has a thickness proportional to a quantity of the multivariate data represented by the first curve; and
a second curve extending from a second periphery portion of the second shape to a first periphery portion of the third shape;
receive a user interaction with the third shape causing a change to the third range of values; and
in response to the user interaction with the third shape, transmit data for updating the first curve as having a reduced thickness.

14. The non-transitory computer-readable medium of claim 13, wherein the first shape represents a first axis for the first variable, the program instructions configured to be executed by the one or more processors to further cause the computing system to:
transmit data to update the user interface to include a textual label within the first shape, the textual label corresponding to a sub-range of values that are within the first range.

15. The non-transitory computer-readable medium of claim 14, wherein the first periphery portion of the first shape corresponds to the sub-range of values for the first variable, and wherein the thickness of the first curve is reduced to be proportional to a number of the multivariate data that fall within the sub-range of values for the first variable, within the second range for the second variable, and within a subset of the third range for the third variable.

16. The non-transitory computer-readable medium of claim 15, the program instructions configured to be executed by the one or more processors to further cause the computing system to:
in response to a user interaction with an option, transmit data to remove the second curve from the user interface; and
transmit data to display a plurality of curves extending from the second periphery portion of the second shape, a quantity of the plurality of curves being the number of the multivariate data that fall within the sub-range of values for the first variable, within the second range for the second variable, and within a subset of the third range for the third variable.

17. The non-transitory computer-readable medium of claim 13, the program instructions configured to be executed by the one or more processors to further cause the computing system to:
include, in the user interface:
a first shape corresponding to a first shape;
a second shape corresponding to a second shape;
a third shape corresponding to a third shape; and
a plurality of textual labels within the third shape, the plurality of textual labels spanning values across the third range; and
in response to the user interaction with the third shape, change the plurality of textual labels to span values across a subset of the third range.

* * * * *